US 12,288,404 B2

(12) United States Patent
Otterness et al.

(10) Patent No.: US 12,288,404 B2
(45) Date of Patent: Apr. 29, 2025

(54) RESOLUTION UPSCALING FOR EVENT DETECTION

(71) Applicant: Nvidia Corporation, Santa Clara, CA (US)

(72) Inventors: Nathan Otterness, Mebane, NC (US); Jonathan White, Fort Collins, CO (US); Dave Clark, Cary, NC (US); Jim van Welzen, Sandy, UT (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 17/476,251

(22) Filed: Sep. 15, 2021

(65) Prior Publication Data
US 2022/0005156 A1     Jan. 6, 2022

Related U.S. Application Data

(63) Continuation of application No. 16/747,143, filed on Jan. 20, 2020, now Pat. No. 11,170,471.

(51) Int. Cl.
*G06V 20/62* (2022.01)
*A63F 13/53* (2014.01)
(Continued)

(52) U.S. Cl.
CPC ............ *G06V 20/635* (2022.01); *A63F 13/53* (2014.09); *G06T 3/4007* (2013.01); *G06V 20/41* (2022.01);
(Continued)

(58) Field of Classification Search
CPC ........ G06T 3/4007; A63F 13/53; A63F 13/52; A63F 13/60; G06V 10/30; G06V 10/56;
(Continued)

(56) References Cited

U.S. PATENT DOCUMENTS 8,944,234 B1    2/2015  Csulits
9,007,189 B1    4/2015  Curtis et al.
(Continued)

FOREIGN PATENT DOCUMENTS

CN     108769821 A    11/2018
CN     109076678 A    12/2018
(Continued)

OTHER PUBLICATIONS

Non-Final Office Action issued in U.S. Appl. No. 16/745,881 dated Jun. 1, 2021.
(Continued)

*Primary Examiner* — Dhaval V Patel
(74) *Attorney, Agent, or Firm* — HOGAN LOVELLS US LLP

(57) ABSTRACT

A game-agnostic event detector can be used to automatically identify game events. Game-specific configuration data can be used to specify types of pre-processing to be performed on media for a game session, as well as types of detectors to be used to detect events for the game. Event data for detected events can be written to an event log in a form that is both human- and process-readable. The event data can be used for various purposes, such as to generate highlight videos or provide player performance feedback. The event data may be determined based upon output from detectors such as optical character recognition (OCR) engines, and the regions may be upscaled and binarized before OCR processing.

20 Claims, 18 Drawing Sheets

(51) Int. Cl.
G06T 3/4007 (2024.01)
G06V 20/40 (2022.01)
G06V 30/148 (2022.01)

(52) U.S. Cl.
CPC ............ G06V 20/46 (2022.01); G06V 30/153 (2022.01); *G06V 20/44* (2022.01)

(58) Field of Classification Search
CPC ...... G06V 20/41; G06V 20/46; G06V 30/153; G06V 20/44; G06V 30/10; G06V 20/635
See application file for complete search history.

(56) References Cited

U.S. PATENT DOCUMENTS

| | | | |
|---|---|---|---|
| 10,737,183 | B1 | 8/2020 | Sharma |
| 11,170,471 | B2* | 11/2021 | Otterness ............. G06V 20/635 |
| 2009/0088233 | A1* | 4/2009 | O'Rourke ............... A63F 13/30 463/7 |
| 2014/0212853 | A1 | 7/2014 | Divakaran |
| 2015/0222239 | A1 | 8/2015 | Zhang |
| 2017/0065888 | A1* | 3/2017 | Cheng .................. A63F 13/497 |
| 2017/0113143 | A1 | 4/2017 | Marr |
| 2017/0128843 | A1 | 5/2017 | Versaci |
| 2017/0136367 | A1* | 5/2017 | Watari .................... A63F 13/63 |
| 2017/0140570 | A1 | 5/2017 | Leibel |
| 2017/0228600 | A1* | 8/2017 | Syed ...................... G06V 20/62 |
| 2017/0282077 | A1 | 10/2017 | De La Cruz |
| 2017/0294081 | A1 | 10/2017 | Washington |
| 2018/0338120 | A1 | 11/2018 | Lemberger et al. |
| 2019/0028306 | A1 | 1/2019 | Namise |
| 2019/0099668 | A1 | 4/2019 | Aliakseyeu |
| 2019/0111347 | A1 | 4/2019 | Rimon |
| 2019/0351335 | A1 | 11/2019 | Yong et al. |
| 2020/0030697 | A1 | 1/2020 | Mueller |
| 2020/0090371 | A1 | 3/2020 | Hu |
| 2020/0126183 | A1* | 4/2020 | Zhu .......................... G06N 3/08 |
| 2020/0175303 | A1 | 6/2020 | Bhat et al. |
| 2020/0211601 | A1* | 7/2020 | Shanmuga Vadivel ..................... H04N 21/4316 |
| 2020/0346121 | A1 | 11/2020 | Beaumont |

FOREIGN PATENT DOCUMENTS

| | | |
|---|---|---|
| CN | 110443238 A | 11/2019 |
| JP | 2002157374 A | 5/2002 |

OTHER PUBLICATIONS

International Search Report and Written Opinion issued in PCT Application No. PCT/US2021/013632 dated Mar. 30, 2021.

Notice of Allowance issued in U.S. Appl. No. 16/669,939, dated Jul. 8, 2021.
Non-Final Office Action issued in U.S. Appl. No. 16/747,143, dated Mar. 11, 2021.
Notice of Allowance issued in U.S. Appl. No. 16/747,143, dated Jul. 21, 2021.
International Search Report and Written Opinion issued in PCT Application No. PCT/US2021/013973 dated Apr. 15, 2021.
Yun-Gyung Cheong et al: "Automatically Generating Surrmary Visualizations from Game Logs", Proceedings of the Fourth Artificial Intelligence and Interactive Digital Entertainment Conference, Oct. 24, 2008 (Oct. 24, 2008), XP055148257, ISBN: 978-1-57-735391-1 Retrieved from the Internet: URL:http://www.aaai.org/Papers/AIIDE/2008/ AIIDE08-028.pdf [retrieved on Oct. 22, 2014] sections 3.3, 4, 4.1, 4.2.
Shih Huang-Chia: "A Survey of Content-Aware Video Analysis for Sports", IEEE Transactions on Circuits and Systems for Video Technology, Institute of Electrical and Electronics Engineers, US, vol. 28, No. 5, May 31, 2018 (May 31, 2018), pp. 1212-1231, XP011683058, ISSN: 1051-8215, DOI: 10.1109/TCSVT.2017. 2655624 [retrieved on May 3, 2018] the whole document.
Guo Jinlin et al: "Localization and Recognition of the Scoreboard in Sports Video Based on SIFT Point Matching", Jan. 5, 2011 (Jan. 5, 2011), ICIAP: International Conference on Image Analysis and Processing, 17th International Conference, Naples, Italy, Sep. 9-13, 2013. Proceedings; [Lecture Notes in Computer Science; Lect. Notes Computer], Springer, Berlin, Heidelberg, pp. 337-343, XP047389069, ISBN: 978-3-642-17318-9 the whole document.
Final Office Action issued in U.S. Appl. No. 16/745,881, dated Dec. 6, 2021.
Non-Final Office Action issued in U.S. Appl. No. 16/745,881, dated May 27, 2022.
Final Office Action issued in U.S. Appl. No. 16/745,881, dated Oct. 13, 2022.
Notice of Allowance issued in U.S. Appl. No. 16/745,881, dated Feb. 23, 2023.
Non-Final Office Action issued in U.S. Appl. No. 16/669,939, dated Nov. 30, 2020.
Non-Final Office Action issued in U.S. Appl. No. 17/495,643, dated Sep. 29, 2022.
Corrected Notice of Allowance Action issued in U.S. Appl. No. 16/747,143, dated Jul. 30, 2021.
Final Office Action issued in U.S. Appl. No. 17/495,643, dated Jun. 1, 202.
Notice of Allowance issued in U.S. Appl. No. 17/495,643, dated Jul. 19, 2023.
"Theory and Application of Intelligent Vehicles", Beijing Institute of Technology Press, ISBN 978-7-5682-5966-8, Jul. 2018, 3 pages.

* cited by examiner

RESOLUTION UPSCALING FOR EVENT DETECTION

CROSS-REFERENCE TO RELATED APPLICATIONS

This application is a continuation of, and claims priority to, co-pending U.S. patent application Ser. No. 16/747,143, filed Jan. 20, 2020, and entitled "RESOLUTION UPSCALING FOR EVENT DETECTION," which is hereby incorporated herein in its entirety and for all purposes.

BACKGROUND

As video game content and uses evolve, there is a corresponding need to adapt the ways in which game content is used and made available. For example, videos of gameplay are increasingly streamed by a large number of viewers, and activities such as e-sports are changing the ways in which online gaming is developed and content presented to viewers. In many instances, these rapid changes have resulted in the presentation of content that is less than optimal for its intended purpose, or that requires manual intervention in order to create the content of interest. In addition to the increase in resources, such manual intervention often increases the amount of time before such content can be presented to an audience of viewers or gamers.

BRIEF DESCRIPTION OF THE DRAWINGS

Various embodiments in accordance with the present disclosure will be described with reference to the drawings, in which.

DETAILED DESCRIPTION

Figure 1A:
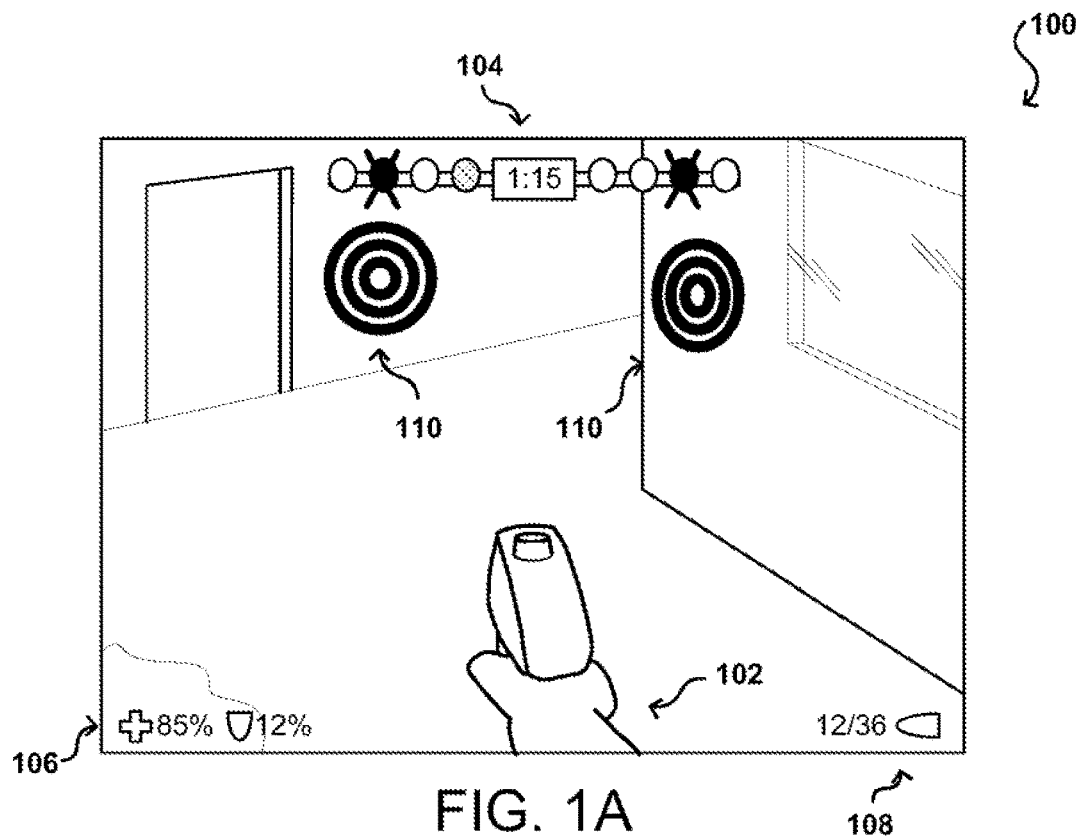
FIGS. 1A and 1B illustrate displays of gaming content that can be analyzed, according to at least one embodiment.

FIG. 1A illustrates an example display 100 that can be rendered for a game in accordance with at least one embodiment. In this example, the game is a first-person shooter type game in which a player is to direct an avatar 102 or playable character through a scene or virtual environment, in order to perform various tasks. In this example, these tasks include shooting targets 110, although various other types of tasks can be performed as well within the scope of various embodiments. A game session may last for up to a specified amount of time, until all targets are hit, or until another such end criterion is satisfied in at least one embodiment. The game may be played offline or online, such as where a player may compete against one or more other players to attempt to be the first to complete tasks for the current level or session, etc.

As illustrated, there may be various gameplay objects rendered for display, as may include the player's avatar 102, a weapon being held by that avatar, targets 110, buildings, background elements, and the like. These objects, as well as their position, may change significantly during gameplay. In addition to these gameplay objects, there are user interface mechanisms used to convey certain types of information to a player. In the example display 100 of FIG. 1A, a first interface mechanism 104 is displayed near a top of the rendered image. This mechanism, often referred to as a status bar or heads-up display (HUD), conveys specific types of information to a player or viewer of the game. In this example, the HUD displays an amount of time left in a current gameplay session, as well as information about a number of targets in the level that the user has successfully hit or targeted. In the example of FIG. 1A, the player is playing against a competitor in the session, and the HUD thus displays the status of both the player and the competitor, indicating the number of targets hit by each.

There may be various situations or use cases in which a player performing a task or action may be of interest to determine. This can include, for example, when a highlight video or video montage is to be created for interesting events in a game session, or when gameplay data for a session is to be used for player analysis or coaching, among other such use cases. In at least some embodiments, it may be desirable to determine when certain types of events occur within a game session in order to log that data, or grab a segment of video ("video clip") representative of one or more of those events, among other such options. In some embodiments a game developer may place hooks or triggers in the game code that can help to determine these events from within the game. In some embodiments, however, the event determination may be performed by a third party, or third party device, that may not have access to the code or internal game data.

In at least one embodiment, media representative of a game session can be analyzed. This can include, for example, an audio and video stream of a game session, or audio and/or video data captured and stored for a game session, among other such options. The media can be analyzed to detect or identify the presence of specific occurrences or events in the game. This can include any event or occurrence in a game, such as may relate to the appearance or disappearance of an object or character, the death or revival of a character, a use of an item, an activation of a switch, a collection of an item, an achievement, and the like. In some embodiments, media data can be analyzed to attempt to determine these occurrences by detecting those specific actions in the audio, video, text, or other such game content.

In many instances, however, it would take a significant amount of training data in order to train a model, or effort to program an algorithm, to detect the various events through the ways in which those events can be represented. For example, a kill in a shooter game can happen in many different ways, from many different angles, to many different characters, and without access to the game code it can be a significant challenge to attempt to train a model, or program an algorithm, or use computer vision, to attempt to detect all these event generations.

For various types of events, however, there can be specific types of actions or occurrences in the game that may be detected without the need for complex model training or algorithm programming. Consider again the display 100 of FIG. 1A. The HUD 104 in this example illustrates the number of remaining targets for each player. Each time a player successfully and/or completely hits a target 110, the HUD is updated to reflect this event. Similarly, each time a player takes significant damage from an opponent the health meter or shield meter displayed in a status message 106 on the screen will decrease, and obtaining a power up, shield, or armor can also cause these numbers to increase. Another status message 108 displays an amount of ammo for a current weapon. Each time a player obtains a new weapon, the ammo (or power, paint, etc.) icon can change accordingly. For each of these status messages or displays, they can occur in approximately the same location with very similar appearances, and can change in very well defined ways. Accordingly, detection of at least certain types of events can be determined by monitoring changes in these and other types of information, icons, or presentations of content that are related to, but distinct from, the actual gameplay involving the avatars, objects, and player characters in the game.

Figure 1B:
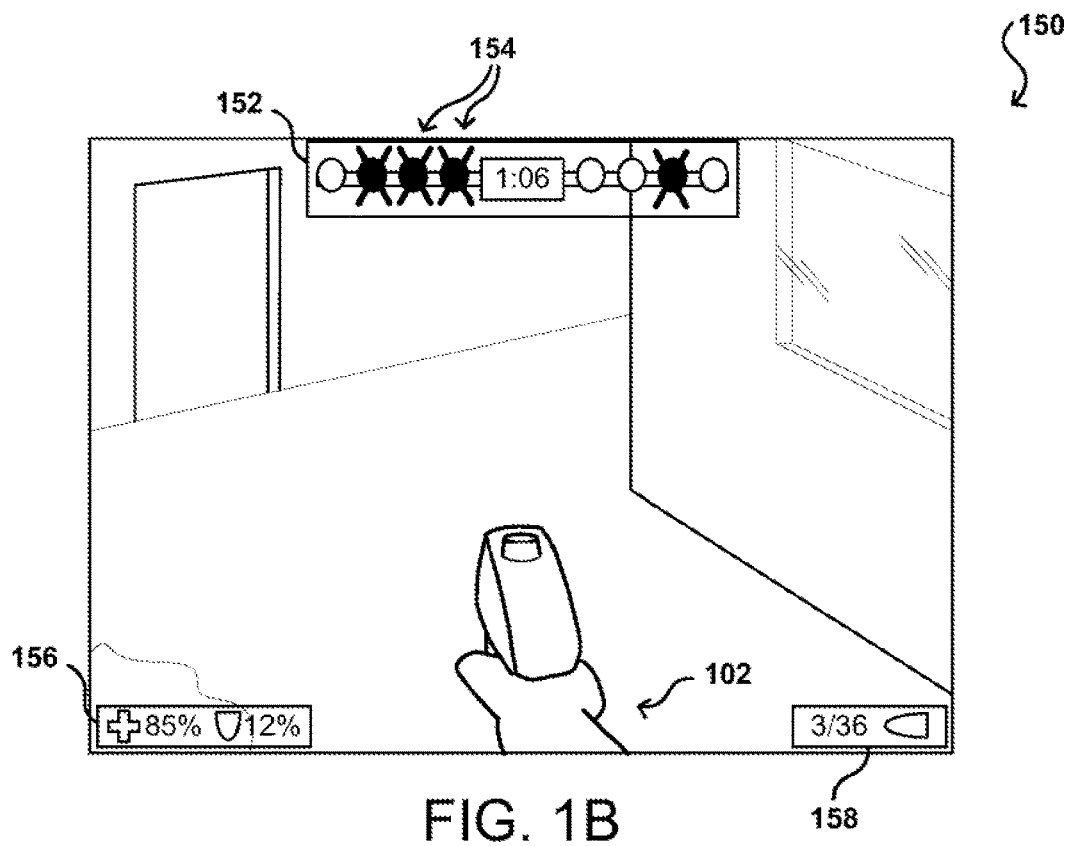

FIG. 1B illustrates a subsequent display 150 at a later time in the game session. In this display, it can be seen that in just a matter of a few seconds, with respect to the display 100 of FIG. 1A, the player hit two additional targets. This is reflected by two changes of icons 154 in the HUD. Another status display illustrates that there was a corresponding reduction in a specific type of ammunition corresponding to the shots that hit the targets. By detecting these very specific changes, a determination can be made that an event occurred, or series of events occurred, that resulted in the player hitting two of the targets. The detection of this event can then be used for a number of different purposes, as discussed in more detail later herein. There may also have been audio sounds generated that correspond to a target being hit by a player, etc.

Since such an approach is looking for specific types of occurrences in a game, or other media content, a set of detectors can be used to detect occurrences that may correspond to events of interest. In the examples of FIGS. 1A and 1B, video content is analyzed (although audio and other content may be analyzed as well in at least some embodiments). The detectors used for such video can include detectors that attempt to detect or recognize specific patterns, icons, text, or images, among other such options.

Further, since the icons, text, or other content will typically be in specific locations in the game display, these detectors can run on the corresponding regions or portions of the display, which can conserve significant resources versus running multiple detectors on entire images, particularly for high resolution displays. For example, in FIG. 1B it is illustrated that sections or regions 154, 156, 158 of the display that are considered for detection include at least some amount of padding around the expected location of the content to be detected. In at least some embodiments it is desirable to not include more pixels than necessary in order to reduce resource requirements and improve speed of detection. In at least some embodiments, however, it is desirable to have a sufficient amount of padding (e.g., a "spatial buffer" in one or more directions from the expected location of the content to be detected), or consider an appropriate number of extra pixels, to allow for slight variations. Variations can occur due to factors such as rendered shaking of the screen content, changes in resolution or user settings, objects appearing or disappearing from view, and the like. In some embodiments the content may also move over time, or change in appearance. Thus, in at least some embodiments the amount of padding to use, as well as the number of regions to analyze, may be game-specific.

Figure 2A:
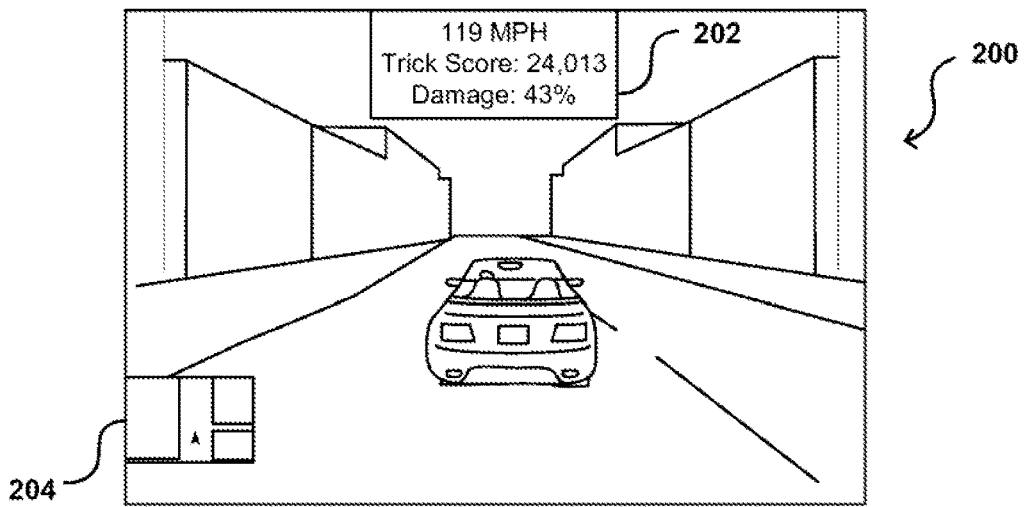
FIGS. 2A, 2B, and 2C illustrate displays of gaming content that can be analyzed, according to at least one embodiment.
Figure 2B:
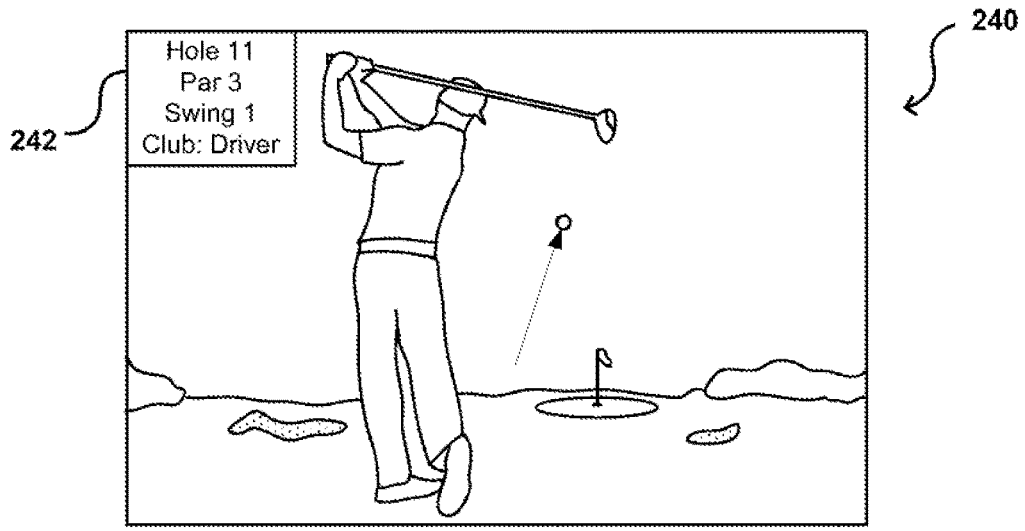

FIGS. 2A and 2B illustrate example displays 200, 240 for other types of games that can be analyzed in accordance with various embodiments. The display 200 of FIG. 2A illustrates an image rendered for a vehicle-based game, where a player may be rewarded for tasks such as performing tricks or causing damage to objects in the environment. For this example, detectors can analyze a region 202 corresponding to a HUD with different information, in this instance including information about a current speed, trick score, and damage level. Such information can be analyzed to determine specific types of events, such as crashes that result in sudden decelerations or explosions that result in rapid accelerations. Large changes in trick score, either at a point in time or over a short period of time, may also be indicative of one or more interesting tricks. Similarly, large changes in the damage score at a point or short period in time can be indicative of interesting events in the game. Another area 204 for analysis may include a map region, which can include icons or graphic elements for objects or gameplay elements near the player in the game, which can change, appear, or disappear corresponding to specific types of events. A detector can be trained to detect these and other occurrences on the map, which may be indicative of certain events of interest.

The example display 240 of FIG. 2B illustrates an image rendered for a golf-based game. In this example, a region 242 is selected for analysis that includes textual information and updates about the status of the game. The detector in this case can include a text detection algorithm, as may include an OCR engine and text analyzer, to determine when certain information is displayed or updated. This information can include, for example, a current number of swings on a certain hole, a change in current hold, and other such information. In cases such as this, it may not necessarily be the information displayed that indicates an event of interest, but a specific type of change in that information, such as would indicate getting a double birdie on a hole. It might be the case, however, that additional information may be displayed at certain times, such as text indicating "birdie" or an icon indicating "nice shot" that might also be indicative of an event of interest.

Figure 2C:
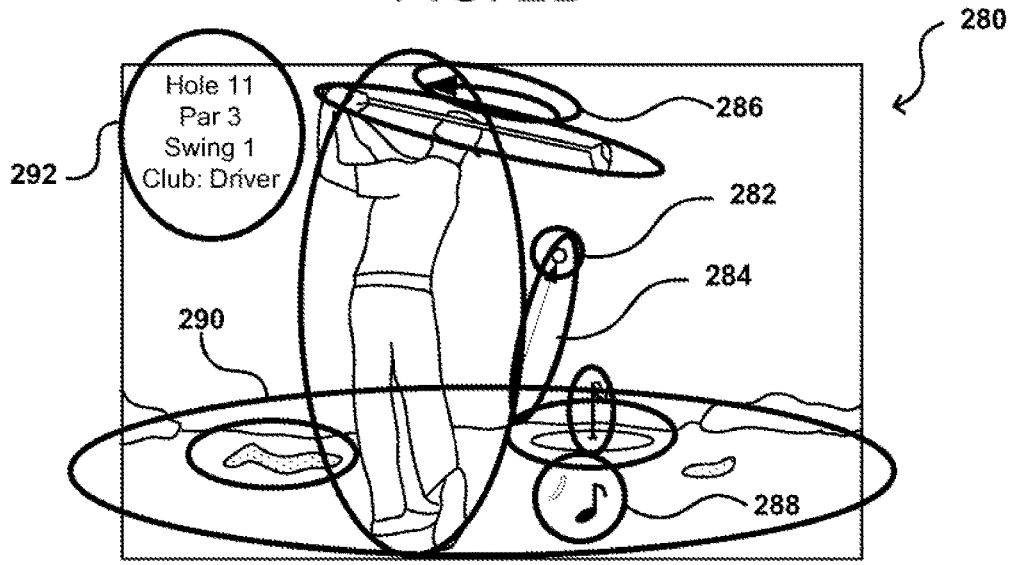

As mentioned, however, various embodiments can analyze or detect additional types of information as well in an attempt to more accurately identify events of interest. As an example, the display 280 of FIG. 2C again corresponds to the golf-based game. In addition to analyzing HUD-type data 292, detectors can also be utilized to attempt to detect other objects, features, actions, or occurrences in gameplay. This can include, for example, detecting a swinging motion 286 of the player avatar, detecting presence 282 and motion 284 of a golf ball, or detecting motion (or lack of motion) in an environment 290 such as a golf course. In some embodiments audio triggers or detectors can also be utilized. In this example, a player avatar hitting a golf ball with a golf club will cause the game to generate a specific type of sound 288 that can be identified as matching an audio pattern or clip. This audio trigger can be indicative of an event where the player hits the ball. Such triggers or events can be used to rapidly identify the points in a game session where a user hit the ball, and similar audio triggers may be used to identify when the ball hits the ground, etc. Various motion, optical flow, audio, and other such detectors, machine learning models, or trained neural networks can be used to analyze a media stream or file of gameplay to detect such events, which can be used together to determine or recognize potential events of interest, and potentially provide more accurate descriptions about those individual actions.

Figure 3:
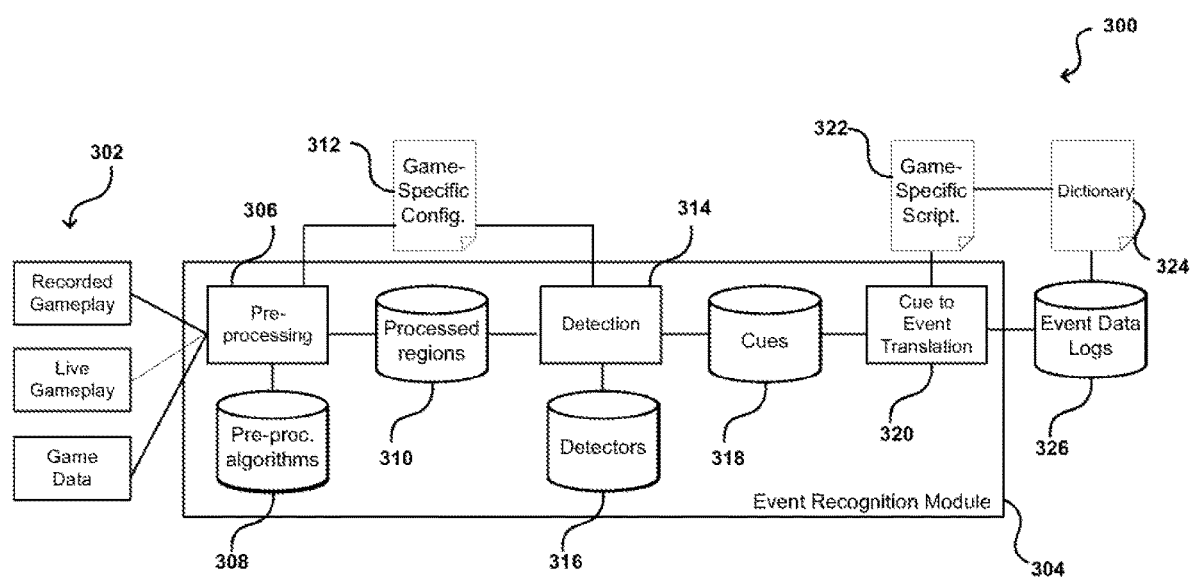
FIG. 3 illustrates an example event recognition pipeline, according to at least one embodiment.

FIG. 3 illustrates an example system 300 that can be used to detect events from gameplay data in accordance with various embodiments. In this example, an event recognition module 304, which can also take the form of a device, system, service, or process in various embodiments, can accept one or more types of gameplay data 302 as input. The input can include, for example, live gameplay received in a media stream, recorded media stored to an accessible storage medium, or media rendered in real time for presentation on a player device, among other such options. In at least some embodiments additional game data may be received as well, to the extent such information is available. This may include text, metadata, player input (e.g., audio, keystroke, or button press), or other such information that may be useful in recognizing events, determining detectors to use, and the like. In some embodiments, this may at least include information about the game being played and/or player whose gameplay data is being analyzed.

In this example, the event recognition module 304 may receive all video frames on a stream for a game session, or may receive a sampling of frames, such as one frame per 100 ms or every tenth frame. In some embodiments the module may receive all frames but only analyze such a sampling. The frames (or other content) to be analyzed can be directed to a pre-processing module 306, which can perform or manage pre-processing of individual frames using one or more pre-processing algorithms. In this example, a repository 308 can store a set of pre-processing algorithms, and the pre-processing module 306 can select the appropriate algorithm(s) for the content. In some embodiments, the algorithms to be applied may be based at least in part upon a type of content to be analyzed, or a result of a prior pre-processing step. In this example, a game-specific configuration file 312 can be consulted that can indicate the types of pre-processing to be performed for a certain game. Various other determination approaches can be used as well within the scope of the various embodiments.

In at least one embodiment, dependent region processing can be performed for one or more video frames. When performing dependent region processing, detection of one object or occurrence can trigger additional processing to be performed for one or more other regions of a frame. For example, an icon may be detected to appear in a first region of a video frame. The appearance of this icon can be indicative of the presence of additional information elsewhere in the video frame. One or more corresponding regions of the frame could then be analyzed using one or more detectors associated with that type of additional information. In at least one embodiment, detection of such an object or occurrence may trigger a sequence or series of detectors to attempt to obtain additional information about a state of the game, whether represented in audio, video, user input, or other such data. It might be the case that one or more of these additional detectors were not enabled when the icon was detected, but are instead activated or triggered upon such detection. In some embodiments, combinations of events are analyzed to determine a particular outcome. For example, an icon might appear on a screen indicating a particular event occurred, but this might be accompanied by another action or display indicating information about the party or player that caused that event or was affected by that event, among other such options.

In this example, individual video frames can have a sequence of pre-processing algorithms applied. This can include, for example, first identifying from the configuration file which region(s) of the image frame to analyze. In this example, the regions are rectangles defined by coordinates or percentages. Percentages can be preferable in some embodiments, as the game may be run at many different possible resolutions and if using discrete coordinates then coordinates either need to be stored for each resolution or a calculation needs to be performed to convert to different coordinates at different resolutions. In one example, a region specification can indicate a region that takes up 10% of the display in width and height, and is at 5% from the top center of the display. These values are highly parameterizable and can be specified for individual games, levels, scenarios, and the like. As mentioned, a given region size can allow for sufficient padding to ensure to capture the intended information or content.

For each region of a frame selected for analysis, one or more pre-processing algorithms can be applied. These algorithms can include, for example, grayscaling, color isolating, converting to HSV (hue, saturation, value) color space, upscaling, downscaling, smoothing, noise removal, filtering, stretching, warping, or perspective correction, among other such options. Various other image or content manipulation techniques are used as well. As a final pre-processing step in this example, some level or type of thresholding may be applied to the pixels of the selected regions in order to provide for at least some level of background removal. As mentioned, in at least some games the content (e.g., text) of interest will be displayed against a background of the game. In order for detection algorithms, such as those that may rely on OCR, to function more accurately, thresholding can be used to remove (or apply a specific value) to background pixels, such that the region once processed appears more like black and white content, particularly for text, which can appear more like the types of content OCR engines were designed to process. Further, aspects such as anti-aliasing and blending can degrade the accuracy of an OCR engine if not sufficiently removed or accounted for in the processing. The thresholding can also help to remove transient background noise where applicable. In this example, the data for the pre-processed regions can then be temporarily stored to a cache 310 or other such location.

A detection module 314 or engine, which can also take the form of a device, system, service, or process, can then access the region data from cache 310 and process the data using one or more detectors. In this example, the game-specific configuration file 312 can specify the detector(s) to be used, which can also vary by selection or type of region to be analyzed. The detectors can include any of a variety of detector types, as may relate to pattern detection, icon detection, text detection, audio detection, image detection, motion detection, and the like. The detection module 314 can access the relevant detectors from a detector repository 316 or other such location, if not already stored in local memory. In various embodiments, a region corresponding to an HUD can have at least text and icon detection performed as discussed elsewhere herein. Where additional game data is available, detection can also include user input analysis, such as to detect inputs, or combinations of inputs, to a keyboard, joypad, controller, etc. If the additional data includes sound or webcam video, the detector can also look for patterns in the audio, such as where a user makes a particular explanation indicative of a type of event, or patterns in the video, where the user makes a particular action or motion indicative of a type of event. Other types of data can be analyzed as well, such as biometric data for a player that may indicate actions or responses indicative of certain types of events. As mentioned, the analysis can be done in near real-time using data streams or after a gameplay session using stored data, among other such options. The types of data available may then depend at least in part upon when the data is analyzed.

The detector module 314 can process the selected regions of the frames (or other game content) using the specified detector(s), which can generate one or more cues or other such outputs, which can be stored to local cache 318 in this example. The cues can be any appropriate cues indicative of, or mapped to, a type of event. As an example, a game might indicate a number of skull icons that indicate a number of kills a player has caused during a current gameplay session. A change in the number of skulls indicates a kill event. A visual cue in that example use case would be the skull itself, such as the third skull appearing at a position it was previously absent from. The appearance of the third skull could then be passed on as a cue that can be used to determine a corresponding event. In at least some embodiments, a cue can be independent of what the cue means, or an event that a given cue indicates. The detection engine 314 in this example can concern itself only with detecting or determining the cue, and not attempting to determine an event.

It can be desirable to determine one or more events, or types of events, indicated by the determined cue(s). This can be performed in at least some embodiments by a cue-to-event translation module 320. This module 320 can include logic, provided through the game-specific script, to determine a type of event from the determined cues. Once an event type is determined, in at least some embodiments it is desirable to provide or communicate information for the detected event(s) in a way that is human-readable, as well as process-readable. In this example, a cue-to-event translation module 320 applies game specific script 322 or logic, and uses terminology from a defined dictionary 324, to transform or translate the cues into human-readable text that conforms to the provided dictionary. Various detectors may provide different types of outputs in different formats, and a cue to event translation module 320 can provide at least some level of standardization so that output can be compared across various detectors. This can be particularly important where multiple detectors may detect cues for the same events, which then need to be correlated as appropriate. These cues may include cues relating to detected text, icons, motions, features, images, sounds, gestures, biometrics, etc. The cue-to-event translation module 320 in at least some embodiments may include one or more trained neural networks, chained or otherwise, that can accept the cues for a specific time or period of gameplay and infer a type of event that occurred with a corresponding confidence value. In this example the translated event data can then be written to an event data log 326 or other such location for access. As mentioned, this log can be human-readable, such that a user or developer can read and understand the log data. The log can also store the data in a format that is usable by one or more processes, algorithms, or applications to perform one or more tasks as discussed herein, as may relate to a generation of montages or highlight videos, player skill analysis, player coaching, game adjustment, player matching, and the like. In some embodiments the event data log will include data for all detected events, while in other embodiments the log might only store data for certain types or numbers of events, or events determined with at least a minimum confidence, among other such options. In at least some embodiments, parameters of the detection, such as a search area, desired cue, and mapping of the changes in state of the cue to event logs, can be configurable via human readable scripts (e.g., JSON—JavaScript Object Notation).

In at least one embodiment, output of a set of detectors (such as five or six detectors for a given game) will be a match or non-match for an event type, with a corresponding confidence value or level of confidence. These cues or other values can then be fed to a process, such as may utilize game-specific script 322 (e.g., JavaScript) in the translation module 320, that can perform additional heuristics per-frame. These heuristics can help to improve the event match determination. For example, an OCR detector might report a match for detecting specific textual content, but heuristics may be applied to see how and when that textual content changed, and by how much, and over what period of time, to determine whether the event actually corresponds to an event of interest for a particular application. These heuristics can also help to enable a game-agnostic event recognition module to be customized per-game using script and configuration files that descry the pre-processing and detection logic to be used for a game, along with per-game script for performing heuristic analysis on the data coming out of the core detection module 314, also referred to as an event detection engine in some embodiments.

Figure 4:
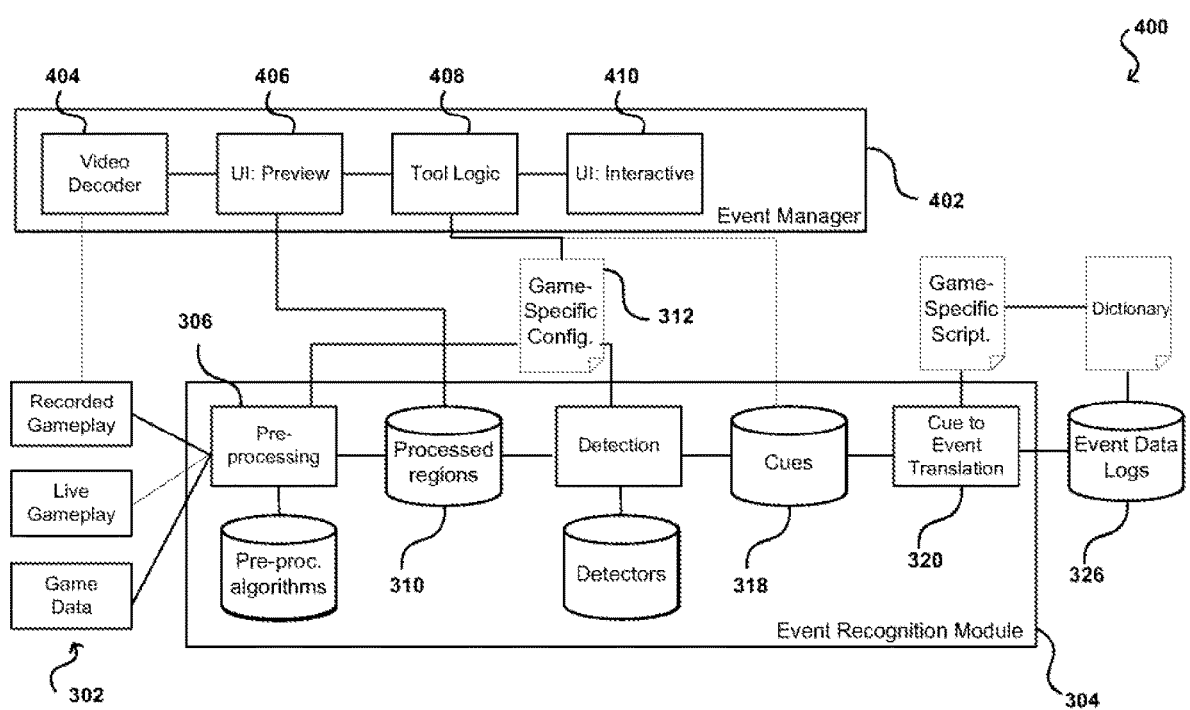
FIG. 4 illustrates an example event manager for specifying event recognition functionality for a game, according to at least one embodiment.

A developer or other authorized user can provide information about events of interest to be detected. FIG. 4 illustrates a system 400 including an event manager 402 that can be utilized in accordance with various embodiments. In this example, recorded gameplay data can be analyzed in an offline manner. A user can access an interface of the event manager to pull in frames of the recorded gameplay, which can be processed by a video decoder 404 in order to generate a preview of individual frames through a first user interface 406. The user can then use one or more interactive controls of the interface 410 to specify one or more regions of frames that are indicative of events of interest. In many instances there may be nothing indicative of such an event in a frame, such that the user may advance to the next frame, or a subsequent frame in the video. If the user notices something indicative of an event of interest, the user can use the controls with the display interface to draw or indicate a region of the frame, such as to draw a bounding box around the region including the content of interest. In some embodiments the user should include an amount of padding in the region, while in other embodiments the padding can be added by tool logic 408 of the event manager, among other such options. The user can use the controls to further associate the region with a type of event, as well as a type of content to be detected, such as specific text, image, icon, pattern, etc. Information for these events, including the regions to be analyzed and related information, can then be written to a game-specific configuration file 312 for the game. When content associated with that game is then received to the event recognition module 304, the game-specific configuration file can be accessed to determine the regions to analyze, as well as the pre-processing to be performed and detectors to be used for those regions for this particular game.

As mentioned, in various embodiments the detection engine or module is game-agnostic, but allows for plug-ins and scripts to enable it to be customized for specific games. This can include, for example, the specification of various triggers and stabilization factors. A native core detection engine will not know the game for which the video corresponds, but will have information about the region to analyze and the pre-processing to be performed, as well as any model to be used for event matching. In at least one embodiment, an engine can trigger a found trigger, using a state machine, when a pattern is located in a frame that was not there in a previous frame. A changed trigger can come when the pattern was there but it has changed, such as where the text changed. There can also be a lost trigger, where the image was there previously but on this frame it is no longer there. In at least one embodiment, these triggers can be controlled by a stability threshold that is configurable and parameterizable. A user can specify that it is expected that an image be detected with at least a minimum confidence over at least a specified period of temporal samples. As an example, the specification might indicate a desire to detect an image or icon in the region with at least 80% confidence over three samples, such as where the sample rate is every 100 ms. As mentioned, specific triggers can be established for certain types of events, either up front or after the fact, when it is desired to generate or filter event data.

The event recognition engine 304 can be part of an overall framework or platform that enables events to be detected, communicated, and acted upon for various purposes, using various types of game data. An advantage to such a framework is that it can enable users to provide plug-ins to add different types of detectors to be used, as well as to define additional types of events to be detected. A user can also select which types of events are of interest for a particular game or application, and the form of the output to be logged, stored, or communicated. A user can also specify a type of output of the pipeline, such as whether event data should be written to a log, stored to a central repository, forwarded directly to a destination for processing, etc.

In some embodiments the user can also specify at least some level of processing to be performed on the event data. For example, in some embodiments a user might want a highlight or montage video automatically generated for a segment of gameplay. In one embodiment, this can cause an application to read the event log to identify events that satisfy one or more criteria for inclusion in the video file to be generated. These might be general criteria for a highlight video, for example, or may be game, user, session, or instance-specific criteria, such as to generate a video showing only kills, crashes, or specific types of events. The criteria can be applied to the event data in an event log, for example, and events satisfying the criteria identified. For video creation, this can then cause the application to pull, from a stored copy of the gameplay session video, segments of video corresponding to those events. These may include, for example, a number or duration of video frames before and after the timing of the event in the gameplay session. The duration or number may depend in part upon the game and type of event. The segments can then be strung together, with corresponding audio and potentially added text or additional content relating to the events, and then provided for display. The video may be available to a player of the game, or accessible to other users or viewers for various use cases and where permitted. Such a video can be used for other purposes as well, such as performance review and coaching for e-sports players.

In some embodiments one or more detectors can correspond to trained machine learning models, such as trained neural networks. These models can be trained for specific games to detect specific actions, objects, motions, or occurrences that correspond to specific types of actions of interest. Other detectors can be used as well as discussed herein, as may relate to character recognition algorithms, optical flow mechanisms, feature recognition, and the like.

It can be desirable in at least some embodiments to do game-specific customization as content can change significantly between games. While an object such as a breed of dog may have a relatively consistent look in actual video, the artistic representation of that breed may vary significantly between games. Objects such as weapons may have a wide variety of appearances that vary across games, and even within games, such that at least some level of game-specific training or event definitions can be utilized for improved performance. Approaches that utilize HUDs or other types of information displays that are relatively consistent, in both appearance and position, can also help improve accuracy and decrease customization, rather than attempting to identify actions based on objects that may vary greatly in appearance throughout the course of a game session. Further, player customizations may be applied that can further change the appearance and functionality of the game, but any changes to a HUD will likely be consistent throughout a game session.

In some embodiments, event data can be used to modify aspects of gameplay as well. For example, in a single-player campaign session the game might adjust a number of enemies or difficulty of computer AI based upon information in the event data. For online gaming, junior or novice players might receive tips for improving gameplay or understanding how to play the game based on detected events. Players can also be matched with similar players, or players with compatible skill types, among other such options. If a player appears to prefer one type of mini-game or gameplay style over another based upon event data, the game can select to adjust the type of game options presented to a user to make the game more enjoyable. Various other modifications can be made as well in accordance with various embodiments.

In at least one embodiment, computer vision and machine learning-based techniques can be used to process game content to detect events. In at least one embodiment, game content can be analyzed to recognize specific types of features in a scene, as may include scenes in which gameplay occurs, objects recognized in a game session that relate to gameplay, and actions performed by a player (or avatar or player controlled gameplay element) during one or more game sessions. In at least one embodiment, one or more gameplay segments can be analyzed for a game scene, and a trained neural network model can generate a set of keywords representative of features determined for that game scene. In at least one embodiment, these keywords can be aggregated and passed to a detection engine.

In at least one embodiment, at least one neural network will be trained per game. In at least one embodiment, a set of neural networks will be trained per game, with different networks being trained to recognize different types of features, such as scenes, actions, or objects. In at least one embodiment, a network can be trained that can be used for inferencing across a variety of games, or at least across games of a specific type or category with at least somewhat similar gameplay. In at least one embodiment, a first model might be trained to recognize features of a type of game like a first person shooter, while another model might be trained to recognize features of a type of game like a platformer or third person adventure game, as there would be different types of features to detect. In at least one embodiment, types of features to detect can vary by game or type of game. In at least one embodiment, training data for these models can include video streams including annotations for features of types to be recognized for that game or type of game. In at least one embodiment, these annotations are performed manually or with modeling assistance. In at least one embodiment, a model can be configured to output one or more detected feature keywords with corresponding confidence values, and keywords with higher confidence values, or values that at least satisfy a minimum confidence criterion, can be utilized for updating a player profile or generating recommendations.

Figure 5:
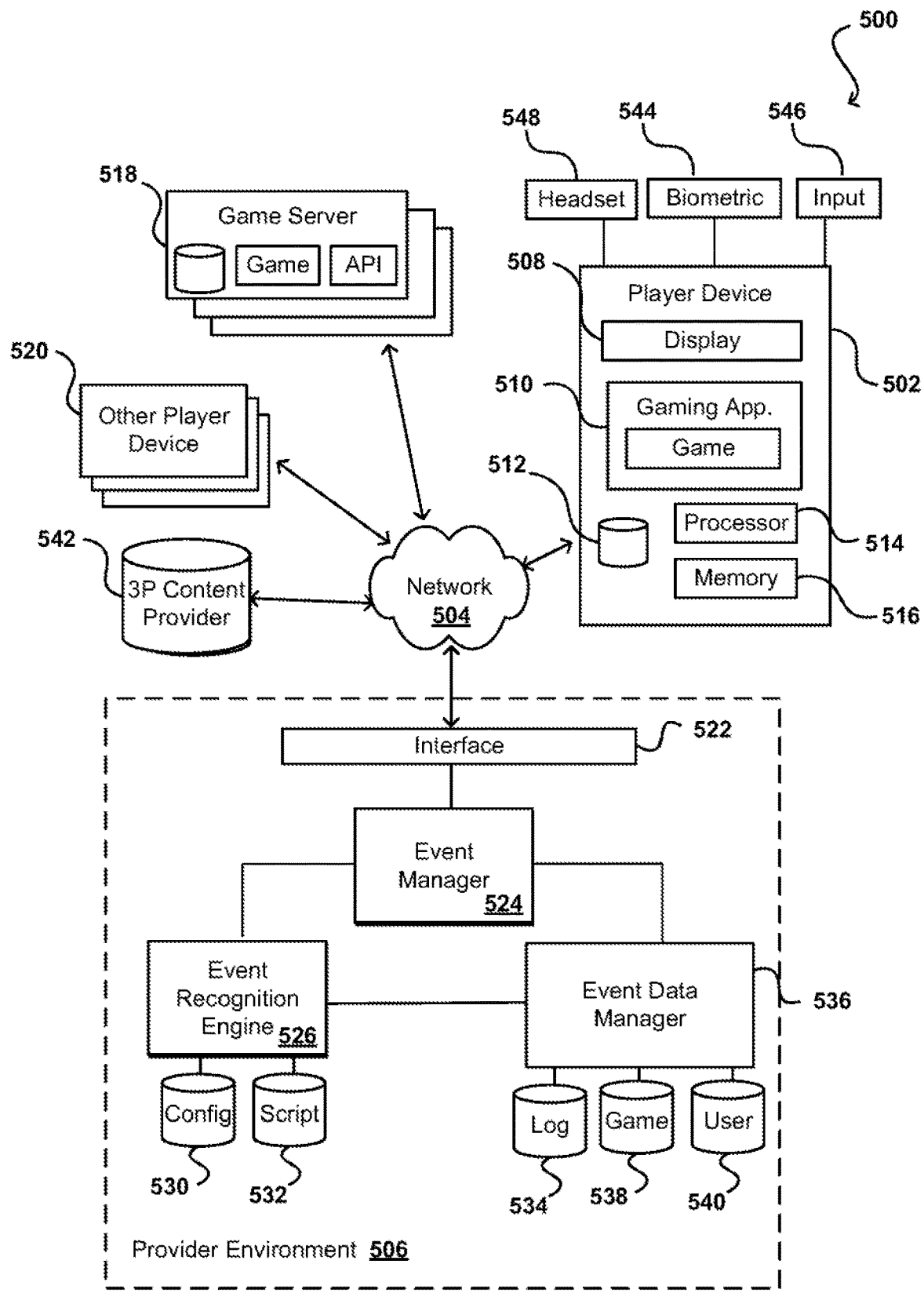
FIG. 5 illustrates an example system that can be used to determine, communicate, and utilize game event data, according to at least one embodiment.

FIG. 5 illustrates an example gaming environment 500 in which aspects of the various embodiments can be implemented. In this example, a player can utilize a player device 502 to play a game through a gaming application 510. The player device 502 can be any appropriate device including at least one processor 514, non-transitory memory 516, and storage 512 for executing game content, or at least for receiving game content and causing that content to be presented to a player using a display 508, headset 548, or other such mechanism. Such devices include, for example, desktop computers, notebook computers, smartphones, tablet computers, gaming consoles, set-top boxes, and the like. In some embodiments the game may have one or more online aspects, which require the player device 502 to communicate with at least one game server 518 over at least one network 504. The network(s) can include any appropriate network for communicating game data, as may include a wired or wireless network, the Internet, a cellular network, an Ethernet, a local area network (LAN), a peer-to-peer network, etc. The game server can host a game session that may involve players using other player devices 520 that communicate over a least one of the networks 504, which may be the same as, or different from, one used by the player device 502.

As mentioned, in some embodiments it will be desirable to perform event detection for a gameplay session for one or more of these players. In different embodiments, the event detection can be performed on a player device 502, on the game server 518 or a related device, by a third party service or resource provider from a provider environment 506, or by a third party content provider system 542. In some embodiments an entity may play one or more of these roles. For embodiments where media such as audio and/or video is analyzed, that data can be stored to, or streamed from, any appropriate location. For example, the gameplay media may be stored on the player device 502 where it is displayed, on the game server 518 responsible for managing game state, or a third party system or environment 542, 506 receiving a stream of the content. Similarly, although event detection is illustrated in this example to be performed "in the cloud" by a resource provider, as may be offered as part of an event detection service, the event detection can be performed on any of these or other such systems or devices by these or other parties.

In this example, a media stream can be sent from the player device 502 across a network 504 to a resource environment 506 to perform the event detection. As discussed, at least some of the components of the resource environment may have counterparts on the player device to perform at least some of the same functionality. Regardless of the location, the media data can be received to an interface, or interface layer 522, that can direct the media to the appropriate destination. The interface layer can include various components, such as (without limitation) one or more application programming interfaces (APIs), routers, switches, load balancers, Web servers, and the like. In this example, the media can be directed to an event manager 524 that is responsible for causing the media to be analyzed and determined event data to be made available, such as to authorized users having an account with the resource provider. As discussed with respect to FIG. 3, the event manager 524 can pass the media to an event recognition engine 526, which can utilize game-specific configuration 530 and script data 532 from an event manager 528 to detect events, which can be passed to an event data manager 536 and written to an event log 534. The event data manager may also store game data 538 and user data 540 corresponding to the event data in the event data log 534. The event manager 524 can then make this event data available to an appropriate entity. This can include, for example, providing the event data to the player device 502, which can then use a local copy of the gameplay media to generate a highlight video or montage for the game session or across stored replays from multiple game sessions. Similarly, a game server 518 might receive the event data to generate a highlight or montage video for an online game session, which can then be viewed by players on the other player devices 520 as well. In the case of online video hosting or streaming, a highlight video might be generated using the event data that can then be made available by a third party content provider 542, such as YouTube®, Twitch®, or Facebook Live®, such as may be broadcast using GeForce Experience® from NVIDIA.

In some embodiments, additional data can be used to improve the accuracy of event detection as discussed herein. This data may include, for example, biometric data captured of a player using one or more biometric trackers 544, such as a fitness tracker or heartrate monitor. The data may include video of the player during gameplay as captured by a webcam, which can indicate changes in player behavior or appearance during gameplay. A headset 548 or other device including a microphone, such as may include the webcam, can also capture exclamations by the user or changes in breathing patterns that may correspond to certain types of events. Various other types of data, and mechanisms for capturing that data, can be utilized as well within the scope of various embodiments.

Figure 6:
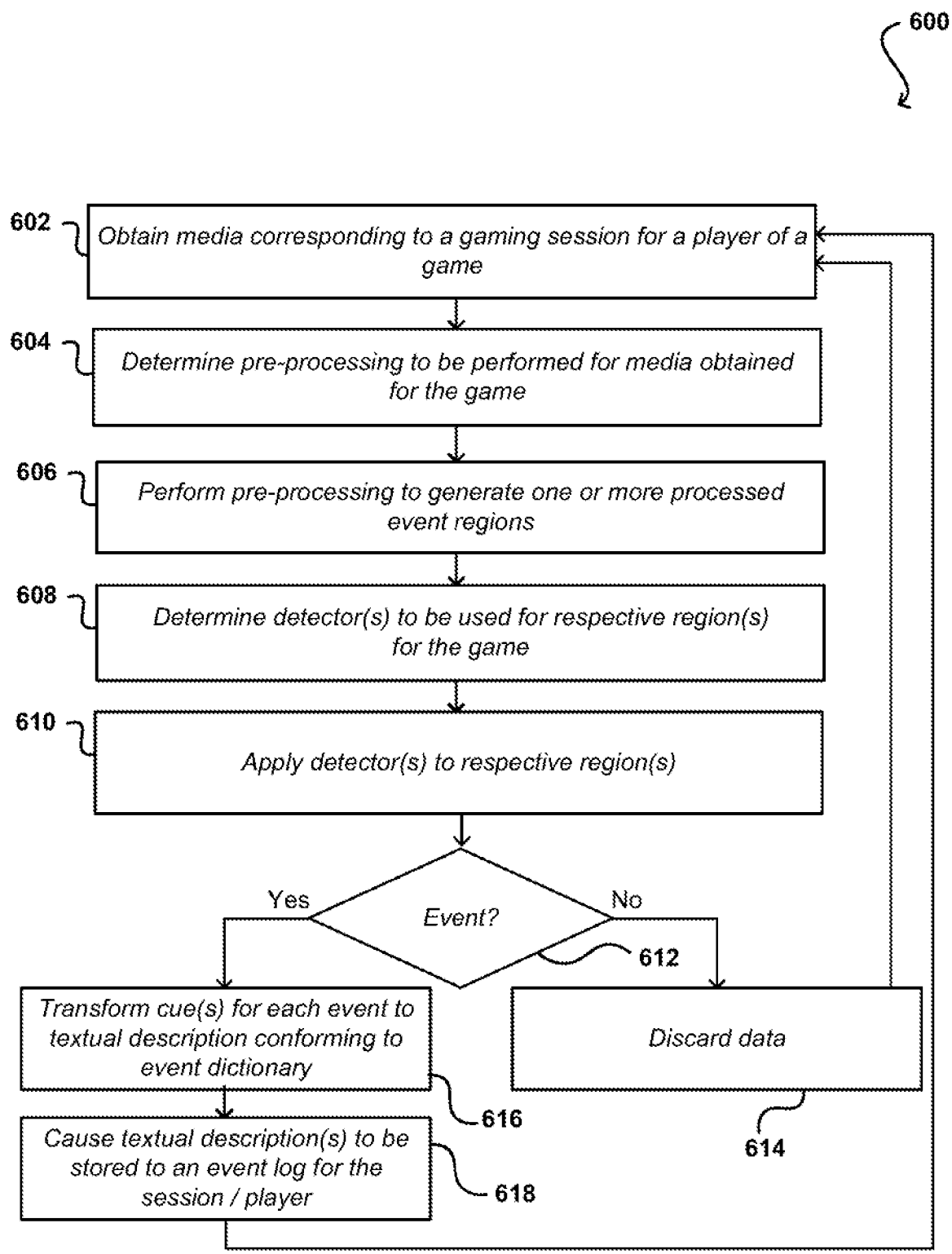
FIG. 6 illustrates a process for generating a log of game event data, according to at least one embodiment.

FIG. 6 illustrates an example process 600 for performing event detection that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, media is obtained 602 that corresponds to a gaming session for a player of a specific game. The media can include audio and video data, for example, that may be received on a data stream or transferred from a media storage, among other such options. A type or amount of pre-processing to be performed on the media can be determined 604, such as by viewing a configuration file corresponding to the specific game. The pre-processing in some embodiments can include determining one or more regions of the media that are associated with a specify event type of interest. Further pre-processing of such a region can be performed as well, as may depend at least in part upon the type of media or event. For example, audio data may be processed to reduce noise. Image data may be upsampled, converted to another color space (e.g., grayscale or HSV), and thresholded to remove background pixel data. Various other types of pre-processing can be used as well as discussed and suggested elsewhere herein. The determined pre-processing can be performed 606 to generate one or more processed event regions for analysis.

In order to perform the analysis, one or more detectors to be used can be determined 608, as may also be specified in a configuration file for a specific game, and may be at least partially dependent upon the type of media or event to be analyzed. As discussed, such detectors may relate to object detectors, icon detectors, OCR engines, optical flow mechanisms, and the like. The detector(s) to be used may also vary between event regions if more than one event region is identified for a particular frame, segment, or instance of gameplay media. The determined detector(s) can then be applied 610 to the respective region(s). The detectors in this example can generate event cues along with corresponding confidence values. In some embodiments, additional heuristics can be applied to these cues to determine whether events of interest criteria are satisfied. A determination can be made 612 as to whether at least one event of interest, or event of a specified type, has been identified. If not, the event data can be discarded 614. If at least one event has been detected, with at least a minimum confidence in some embodiments, then the generated cues for the event can be transformed 616 to a textual description to conform to an event dictionary. The description can be both process and human readable, and can correspond to a dictionary that is consistent across multiple games. The textual descriptions can then be caused 618 to be stored to an event log for the session and/or player, as may be stored on a game server, player device, or other such location. This data can be made available to any authorized party for any appropriate reason or usage as discussed and suggested herein.

Figure 7:
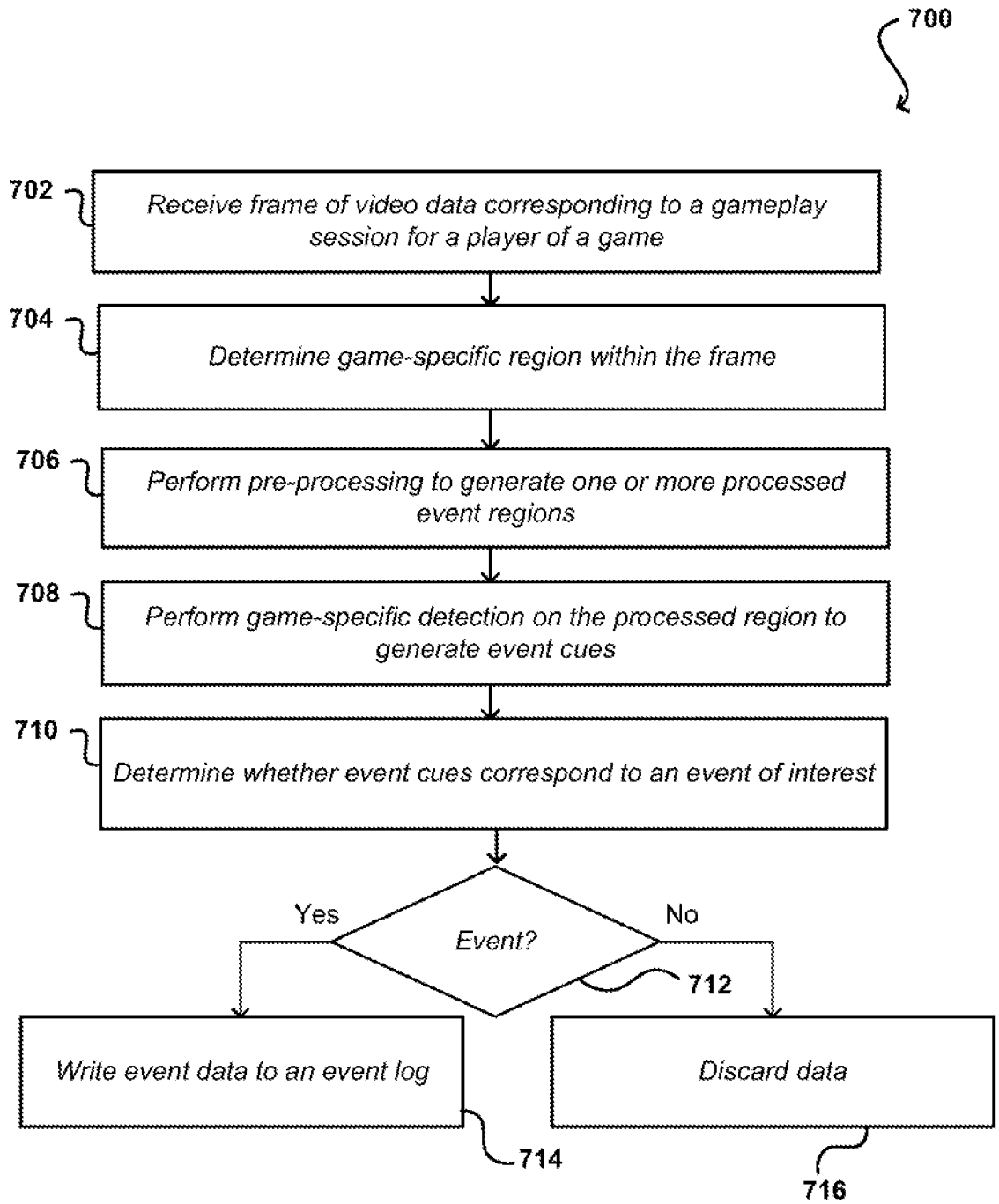
FIG. 7 illustrates a process for determining event data from gameplay video, according to at least one embodiment.

FIG. 7 illustrates an example process 700 for detecting an event, such as discussed with respect to FIG. 6, in the case of video data received on a video stream. In this example, which can be utilized in accordance with various embodiments, a frame of video data can be received 702 on a video stream corresponding to a gameplay session for a player of a game. A game-specific event region can be determined 704 within the frame. The region can be specified by a game-specific configuration file in at least some embodiments, as may correspond to the location of a HUD or other such display. Pre-processing of the event region can be performed 706 to at least remove background pixel data. This may include, for example, performing an upscaling and changing to a determined color space, performing noise removal, then thresholding to remove background noise. As mentioned, such pre-processing can result in an image that is substantially binarized, which can improve performance of OCR engines at least for text detection. Game-specific character, icon, and/or object detection can be performed 708 on the processed region to generate event cues, using detectors that may be specified by the game-specific configuration file. It can be determined 710, such as by using various heuristics, whether these cues correspond to an event of interest, or of a specified type, for the specific game. If it is determined 712 that such an event was detected, then event data for the event can be written 714 to an event log or other such location, and made available for access and usage. If no event was detected then the event data, and related data from the processing, can be discarded 716.

Figure 8A:
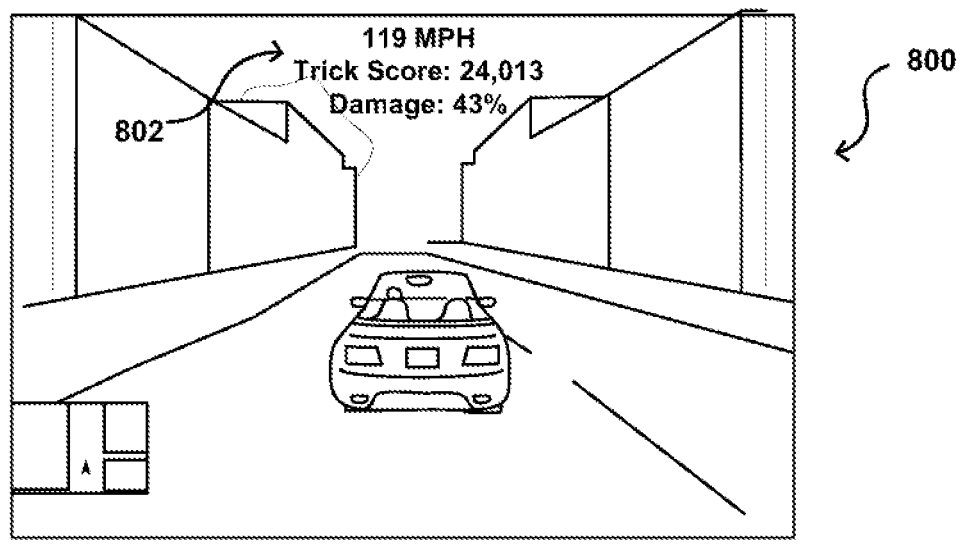
FIGS. 8A, 8B, 8C, 8D, and 8E illustrate graphical content that can be analyzed, according to at least one embodiment.

As mentioned, in at least some embodiments game events can be determined at least in part from text or characters displayed during gameplay, such as may be displayed through a heads-up display (HUD) or other informational element. For many games, this text will be displayed or drawn on top of (e.g., over) the renderings, or natural video, for the scene or game world. The edges of an example HUD 802, as illustrated in the game image 800 of FIG. 8A, will often be drawn as soft edges, wherein the pixel values near a HUD edge will be some composite of the HUD element and the game world background, such as may result from anti-aliasing. Anti-aliasing, and related techniques, are frequently used to provide higher visual fidelity, and reduce the presence of jagged or harsh edges in an image. While this compositing and anti-aliasing (or smoothing) may produce more visually appealing images, such processing can present challenges to various detection algorithms that will need to disambiguate HUD element pixel values from game world pixel values. Similar challenges arise in image and video content unrelated to gaming, as discussed elsewhere herein.

Figure 8B:
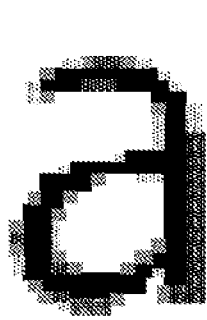
Figure 8C:
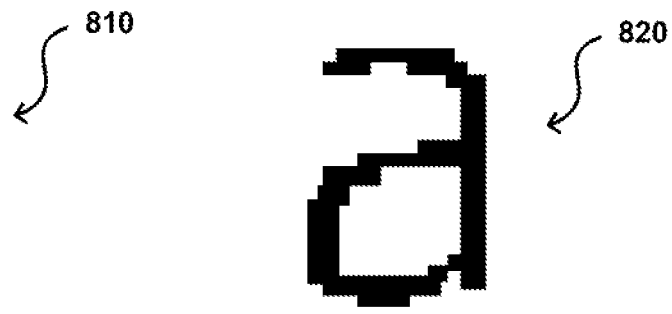

As an example, FIG. 8B illustrates an example "low resolution" character 810 with anti-aliasing. "Low resolution" can be relative as discussed in more detail herein, and can correspond to various resolutions depending upon an application, overall image resolution, or other such factors. In one embodiment, a low resolution character might be a character that is on the order of ten pixels in height. As illustrated in FIG. 8B, there are varying pixel values around an edge of the character in order to attempt to smooth an appearance of the character edges. These pixels of different values can make it challenging to determine which pixels correspond to the character and which pixels correspond to the background (or non-character image content). One approach to disambiguating these pixels is to perform thresholding or pixilation of pixels for, or near, the character. In such a process, pixels with values above (or below, depending upon the implementation) a specific value threshold are determined to correspond to the character, and pixels below the threshold are determined to correspond to the game background. Such an approach for a "low resolution" character can result in a character 820 such as that in FIG. 8C, where pixels are clearly either character or background. As illustrated, however, such thresholding can result in jagged edges and irregular character line widths that can reduce the visual fidelity of the input that will be provided to a detection algorithm, such as for optical character recognition (OCR). This reduction in visual fidelity can reduce the accuracy of the detector because information about fine details of character, or HUD element, is lost.

Approaches in accordance with various embodiments can attempt to improve the visual fidelity of input to such a detector, or other such component or process, by introducing resolution upscaling before use of disambiguating pre-processing, which may be applied before detection analysis. In at least one embodiment, a section of an image is determined (such as may correspond to a HUD) that is to be analyzed. This section can then be upscaled in resolution using interpolation that preserves fine-grained information of the section or element. Subsequent disambiguation pre-processing can then be applied to the higher resolution region and not the original resolution region, which can provide input to the decoder that is both separated from the background and which retains visual fidelity, ultimately leading to better detection accuracy. Such an approach limits the cost, resources, and processing time needed if an entire image were to be upscaled before pre-processing and analysis.

Figure 8D:
Figure 8E:

Consider the character 810 illustrated in FIG. 8B. In at least one embodiment, this character (or another such graphical element) can be upscaled in resolution, such as by using a bi-cubic upscaler on selected pixels of a bitmap, to generate a higher resolution version, such as the character 830 illustrated in FIG. 8D. As illustrated, the anti-aliasing is much less pronounced and the edges better defined. Subsequently applying thresholding or binarization to this higher resolution character can result in a binary character 840 as illustrated in FIG. 8E. This character still has some jaggedness to the edges, but the impact is much less pronounced and the shape or edge of the binarized character much more clearly defined. Providing this character 840 as input to an OCR engine, or other such detector, is much more likely to result in an accurate determination than using the binarized, lower-resolution version 820. While this example uses a single character for clarity of explanation, it should be understood that such a process can be applied to any graphical element or group of graphical elements, alphanumeric or otherwise, particularly where those elements may be displayed or drawn over a background or other elements that can impact an appearance of edge pixels in the rendered image. In embodiments where pre-processing is not performed, providing higher-resolution characters 830 with finer-grained anti-aliasing will also result in higher accuracy than if using lower-resolution characters 810 with more prominent anti-aliasing.

Such an approach can be used beneficially with game content to detect events as discussed herein. Referring back to FIG. 3, an upscaler can be included in the pre-processing module 306, or may be provided as a separate component (not shown) that receives at least some of the input data 302, identifies potential event regions, and then upscales those regions before providing data for those regions to the pre-processing module. In some embodiments, an upscaling module might be used in place of the pre-processing module 306 as well. If the occurrence of interest is not related to an event, then the region may be a character region or any other region to be analyzed in at least some embodiments.

In some embodiments, a subset of video frames may be sampled in the background during gameplay, such as one frame per second, although all video frames can be analyzed in other embodiments. Those frames can be run through an image and character recognition system as discussed herein that can attempt to recognize certain patterns at certain locations in those frames. Such a recognition system can function as a lightweight version of a machine learning model, where the system looks for patterns or sequences of text, such as may correspond to a HUD or similar display of content. Certain patterns or sequences of text, or changes therein, can be indicative of specific events occurring, such as a player terminating an opposing character or obtaining an objective.

For many games, graphical displays such as HUDs provide information regarding a current status or state of gameplay for a session. In order to avoid obscuring important gameplay objects, these HUDs are generally relatively small in size relative to the overall display size. In situations where there is semi-transparently anti-aliased text, this text will blend in with the background as it is changing. Since the characters in an example HUD may only be on the order of about 10-15 pixels such as is illustrated in FIG. 8B, this can cause significant accuracy issues for a detector such as an OCR system if not addressed. Upscaling resolution as discussed herein can help to reduce an impact of factors such as low resolution, anti-aliasing, and varying backgrounds, in order to improve overall detection accuracy, which in turn provides for more accurate event determination. As mentioned, the entire HUD area may be relatively small so a region to be upsampled may be relatively small as well, such as on the order of tens or hundreds of pixels, and upsampling and processing only this relatively small area can provide significant cost and resource savings versus the entire image or frame of content. Various advanced or high-quality upscaling algorithms can be used in various embodiments, as may include cubic or bicubic algorithms, bilinear algorithms, edge-based enlarging algorithms, fractal scaling algorithms, and the like. In at least some embodiments the type of upscaler used can depend at least in part upon the type of content to be analyzed, or the type of analysis to be performed. An appropriate amount of upscaling can be applied that may vary based on various factors, such as a size or resolution of a region to be analyzed. In one embodiment, an upscaling of four times in resolution is utilized. This upscaling can be used to generate a quasi-higher resolution quality image that will have less jagged edges or more subtle anti-aliasing effects.

Such an approach can provide for better accuracy of OCR engines that are primarily designed to analyze scanned documents or other fixed files that do not have varying backgrounds and content, or significant anti-aliasing. Elements such as HUDs can also have varying types of content, both textual and graphical, as may relate to various game statuses and statistics, as may relate to health, score, number of kills, remaining lives, etc. Various HUDs render this information using a combination of bitmap icons, or iconography, and text, which is presented against a colored, changing background in many cases, as opposed to static black text on a plain white background as in a book or document. In some embodiments the location of the text in a game frame can move over time as well, as discussed elsewhere herein.

In various embodiments, upscaling is performed before steps such as binarization and background removal (e.g., applying a hue saturation value threshold to pixels in HSV color space). Thresholds used in various embodiments can be fixed, temporal, or dynamic, as may be user configurable. In other embodiments upscaling can be performed after, or concurrent with, any of these other pre-processing steps. For example, an image might be converted to a grayscale image before upscaling, or have at least some level of thresholding applied to remove some amount of anti-aliasing. In some embodiments upscaling can be performed before steps such as event region determination, such as by upscaling an entire video frame for analysis. In such situations, an amount of padding can be determined after upscaling. As mentioned, an amount of padding can depend upon a presence of factors such as resolution changes, scene effects, game configuration, HUD configuration, and the like. In at least some embodiments the amount of padding is selected to be large enough to include the content of interest in light of these factors, while minimizing an excess number of pixels to be processed. In at least some embodiments multiple regions of a frame can be upscaled for processing, and the processing can be performed in sequence or in parallel on the same, or different, processing hardware. In some embodiments at least some of this processing can be done by a remote computer or process, such as may be part of a shared-resource or cloud offering.

Figure 9:
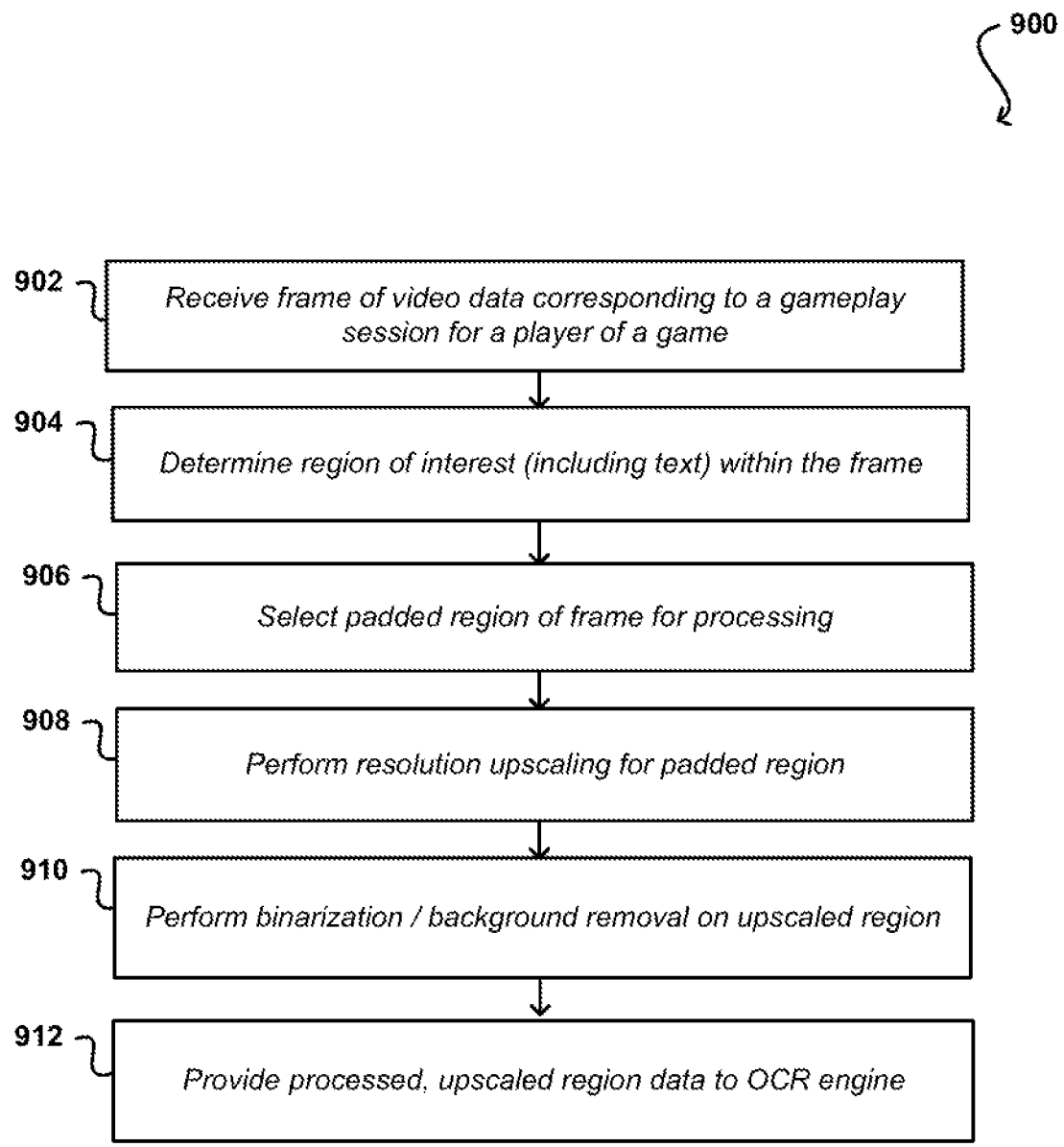
FIG. 9 illustrates a process for processing video content for character recognition, according to at least one embodiment.

FIG. 9 illustrates an example process 900 for processing a region of a frame of gameplay for text detection that can be utilized in accordance with various embodiments. It should be understood that for this and other processes discussed herein that there may be additional, fewer, or alternative steps performed in similar or alternative orders, or in parallel, within the scope of the various embodiments unless otherwise specifically stated. In this example, a frame of video data is received 902 that corresponds to a gameplay session for a player of a game. Various other types of video content or image data can be received as well as discussed herein. One or more regions of interest can be determined 904 from the received frame, such as may correspond to a HUD or other graphical display or element that includes textual content. The regions can be determined using various approaches discussed and suggested herein, such as pattern recognition, historical analysis, or machine learning. An amount of padding can be selected 906 or determined that is to be used around the content in the region of interest, in order to allow for potential variances in position. Each region of interest, including the respective padding, can then have resolution upscaling performed 908. In some embodiments, the data for the padded region will be copied to a new image portion, which may be kept in memory or stored separately for subsequent analysis. The upscaling can be performed using any appropriate upscaling algorithm, such as a bi-cubic upscaling algorithm. The upscaled region can then have various types of pre-processing performed 910, such as may include binarization and background removal. Data for this processed, upscaled region can then be provided 912 to an optical character recognition (OCR) engine for analysis.

Figure 10:
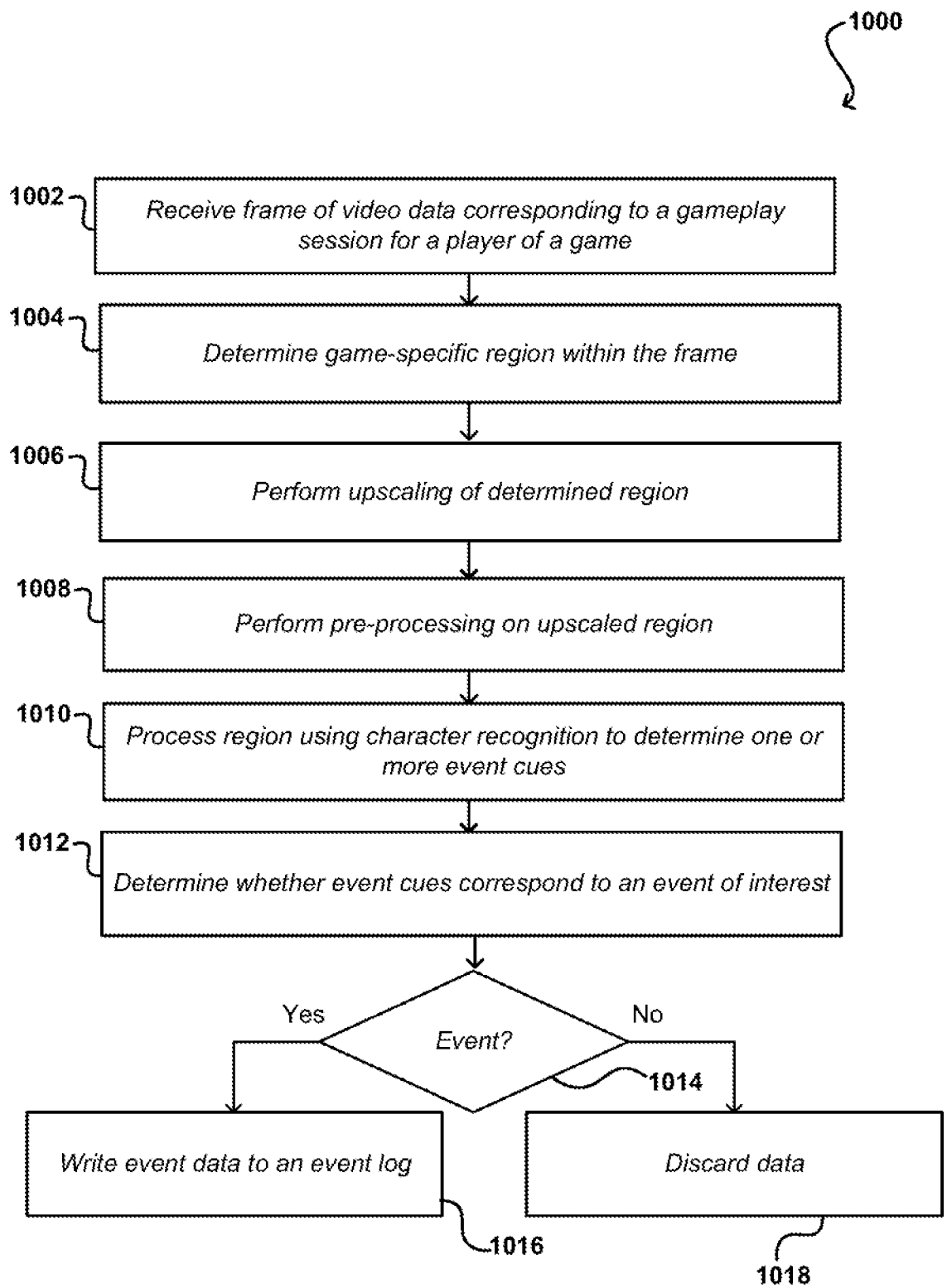
FIG. 10 illustrates a process for detecting events using upscaled event regions, according to at least one embodiment.

Such a process can be used to provide content to be used for an event detection system. FIG. 10 illustrates an example process 1000 for determining game events from data processed using such an upscaling approach. In this example, a frame of video data is received 1002 that corresponds to a gameplay session for a player of a game. Using a technique such as those discussed herein, a game-specific region can be determined 1004 within the frame, such as may correspond to a heads up display or contextual element. Upscaling of the region can be performed 1006 using an appropriate upscaling algorithm, to provide a determined amount of upscaling or increase in resolution for the determined region. One or more types of pre-processing can then be performed 1008 on the upscaled region as may include binarization and background removal, among other such options. This region can then be processed 1010 using character recognition to determine one or more event cues. As mentioned, these cues may include a presence or change in text or characters that are indicative of, or associated with, a certain type of event within a current game. The event cues can be analyzed 1012 to determine whether the cues likely correspond to an event of interest. If it is determined 1014 that an event cue correspond to an event of interest, then event data can be written 1016 to a log or otherwise stored for subsequent analysis, use, or presentation. If the event cues are determined to not correspond to an event of interest, then the event cue data can be discarded, although the data may still be logged in at least some embodiments.

Inference and Training Logic

Figure 11:
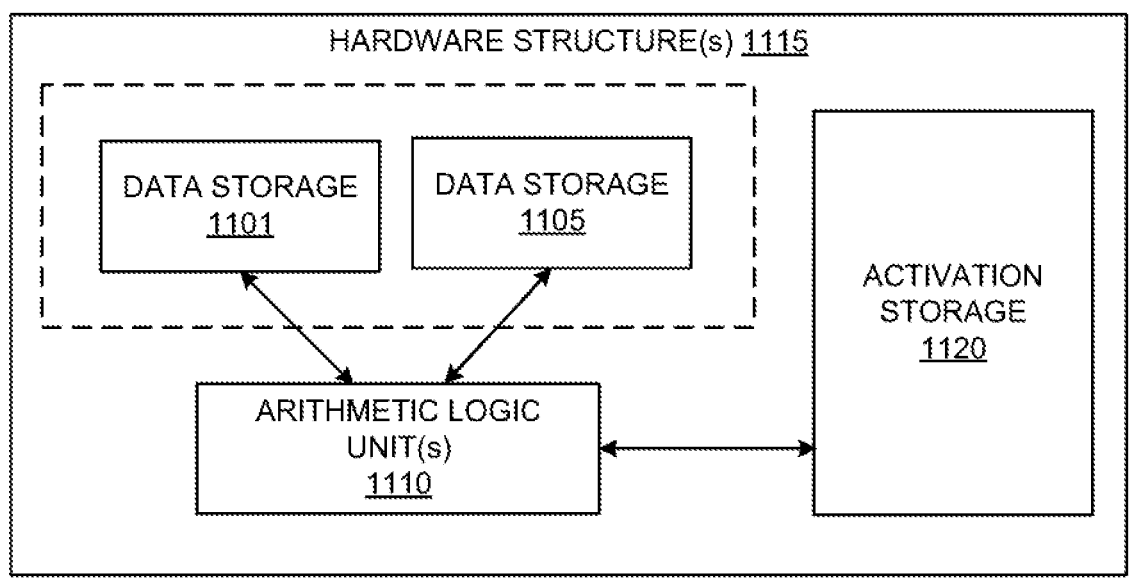
FIG. 11 illustrates inference and/or training logic, according to at least one embodiment.

FIG. 11 illustrates inference and/or training logic 1115 used to perform inferencing and/or training operations associated with at least one embodiment. Details regarding inference and/or training logic 1115 are provided below in conjunction with FIGS. 11 and 12.

In at least one embodiment, inference and/or training logic 1115 may include, without limitation, code and/or data storage 1101 to store forward and/or output weight and/or input/output data, and/or other parameters to configure neurons or layers of a neural network trained and/or used for inferencing in aspects of one or more embodiments. In at least one embodiment, training logic 1115 may include, or be coupled to code and/or data storage 1101 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which this code corresponds. In at least one embodiment, code and/or data storage 1101 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1101 may be included with other on-chip or off-chip data storage, including a processor's L1, L2, or L3 cache or system memory.

In at least one embodiment, any portion of code and/or data storage 1101 may be internal or external to one or more processors or other hardware logic devices or circuits. In at least one embodiment, code and/or code and/or data storage 1101 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1101 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1115 may include, without limitation, a code and/or data storage 1105 to store backward and/or output weight and/or input/output data corresponding to neurons or layers of a neural network trained and/or used for inferencing in aspects of one or more embodiments. In at least one embodiment, code and/or data storage 1105 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1115 may include, or be coupled to code and/or data storage 1105 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which this code corresponds. In at least one embodiment, any portion of code and/or data storage 1105 may be included with other on-chip or off-chip data storage, including a processor's L1, L2, or L3 cache or system memory. In at least one embodiment, any portion of code and/or data storage 1105 may be internal or external to on one or more processors or other hardware logic devices or circuits. In at least one embodiment, code and/or data storage 1105 may be cache memory, DRAM, SRAM, non-volatile memory (e.g., Flash memory), or other storage. In at least one embodiment, choice of whether code and/or data storage 1105 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1101 and code and/or data storage 1105 may be separate storage structures. In at least one embodiment, code and/or data storage 1101 and code and/or data storage 1105 may be same storage structure. In at least one embodiment, code and/or data storage 1101 and code and/or data storage 1105 may be partially same storage structure and partially separate storage structures. In at least one embodiment, any portion of code and/or data storage 1101 and code and/or data storage 1105 may be included with other on-chip or off-chip data storage, including a processor's L1, L2, or L3 cache or system memory.

In at least one embodiment, inference and/or training logic 1115 may include, without limitation, one or more arithmetic logic unit(s) ("ALU(s)") 910, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 920 that are functions of input/output and/or weight parameter data stored in code and/or data storage 901 and/or code and/or data storage 905. In at least one embodiment, activations stored in activation storage 920 are generated according to linear algebraic and or matrix-based mathematics performed by ALU(s) in response to performing instructions or other code, wherein weight values stored in code and/or data storage 905 and/or code and/or data storage 901 are used as operands along with other values, such as bias values, gradient information, momentum values, or other parameters or hyperparameters, any or all of which may be stored in code and/or data storage 905 or code and/or data storage 901 or another storage on or off-chip.

In at least one embodiment, ALU(s) are included within one or more processors or other hardware logic devices or circuits, whereas in another embodiment, ALU(s) may be external to a processor or other hardware logic device or circuit that uses them (e.g., a co-processor). In at least one embodiment, ALUs may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 901, code and/or data storage 905, and activation storage 920 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 920 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 920 may be cache memory, DRAM, SRAM, non-volatile memory (e.g., Flash memory), or other storage. In at least one embodiment, activation storage 920 may be completely or partially within or external to one or more processors or other logical circuits. In at least one embodiment, choice of whether activation storage 920 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1115 illustrated in FIG. 9 may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1115 illustrated in FIG. 9 may be used in conjunction with central processing unit ("CPU") hardware, graphics processing unit ("GPU") hardware or other hardware, such as field programmable gate arrays ("FPGAs").

Figure 12:
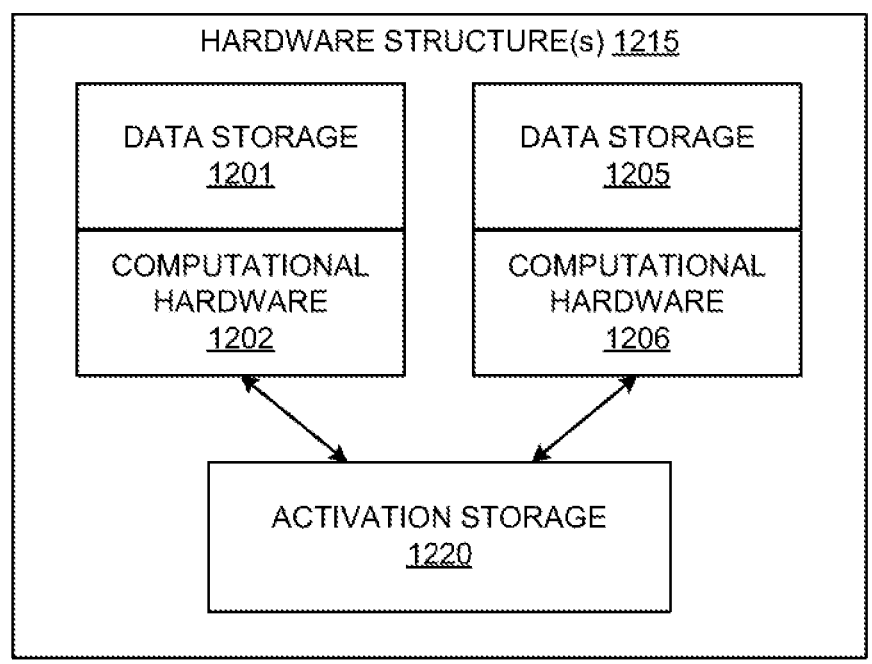
FIG. 12 illustrates inference and/or training logic, according to at least one embodiment.

FIG. 12 illustrates inference and/or training logic 1215, according to at least one or more embodiments. In at least one embodiment, inference and/or training logic 1215 may include, without limitation, hardware logic in which computational resources are dedicated or otherwise exclusively used in conjunction with weight values or other information corresponding to one or more layers of neurons within a neural network. In at least one embodiment, inference and/or training logic 1215 illustrated in FIG. 12 may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1215 illustrated in FIG. 12 may be used in conjunction with central processing unit (CPU) hardware, graphics processing unit (GPU) hardware or other hardware, such as field programmable gate arrays (FPGAs). In at least one embodiment, inference and/or training logic 1215 includes, without limitation, code and/or data storage 1201 and code and/or data storage 1205, which may be used to store code (e.g., graph code), weight values and/or other information, including bias values, gradient information, momentum values, and/or other parameter or hyperparameter information. In at least one embodiment illustrated in FIG. 12, each of code and/or data storage 1201 and code and/or data storage 1205 is associated with a dedicated computational resource, such as computational hardware 1202 and computational hardware 1206, respectively. In at least one embodiment, each of computational hardware 1202 and computational hardware 1206 comprises one or more ALUs that perform mathematical functions, such as linear algebraic functions, only on information stored in code and/or data storage 1201 and code and/or data storage 1205, respectively, result of which is stored in activation storage 1220.

In at least one embodiment, each of code and/or data storage 1201 and 1205 and corresponding computational hardware 1202 and 1206, respectively, correspond to different layers of a neural network, such that resulting activation from one "storage/computational pair 1201/1202" of code and/or data storage 1201 and computational hardware 1202 is provided as an input to "storage/computational pair 1205/1206" of code and/or data storage 1205 and computational hardware 1206, in order to mirror conceptual organization of a neural network. In at least one embodiment, each of storage/computational pairs 1201/1202 and 1205/1206 may correspond to more than one neural network layer. In at least one embodiment, additional storage/computation pairs (not shown) subsequent to or in parallel with storage computation pairs 1201/1202 and 1205/1206 may be included in inference and/or training logic 1215.

Inference and training logic such at that discussed with respect to FIG. 12 can be used to train one or more neural networks to analyze a media stream or file of video data, as may correspond to gameplay data. These neural networks, which can run on described hardware structures 1215, can be used for inferencing for detecting objects or occurrences, as well as inferring types of events based upon data for these detected objects or occurrences. Different neural networks or machine learning models can be trained for different games, types of game, types of video content, or types of events, among other such options.

Data Center

Figure 13:
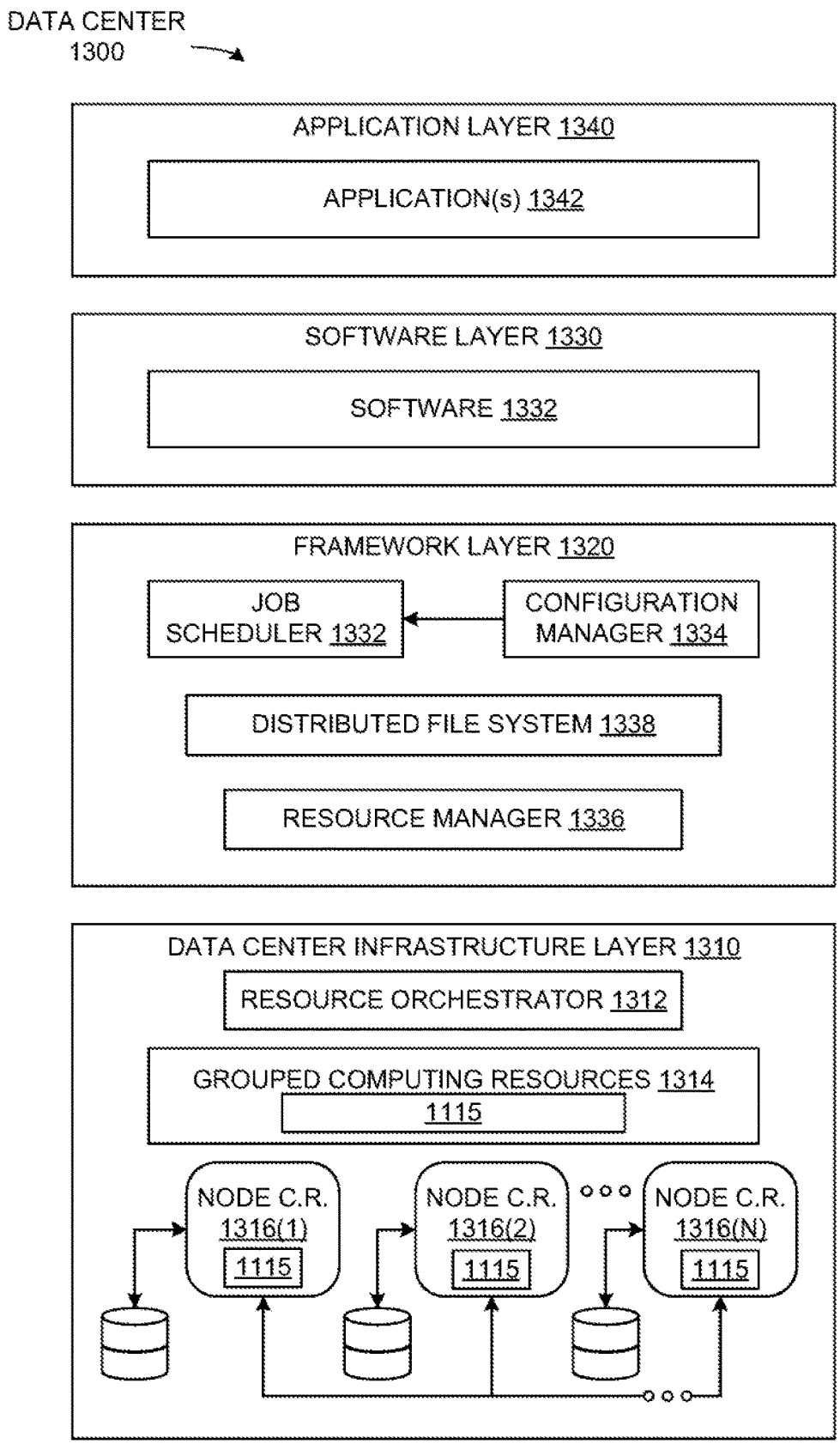
FIG. 13 illustrates a data center system, according to at least one embodiment.

FIG. 13 illustrates an example data center 1300, in which at least one embodiment may be used. In at least one embodiment, data center 1300 includes a data center infrastructure layer 1310, a framework layer 1320, a software layer 1330, and an application layer 1340.

In at least one embodiment, as shown in FIG. 13, data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1316(1)-1316(N) may be a server having one or more of above-mentioned computing resources.

In at least one embodiment, grouped computing resources 1314 may include separate groupings of node C.R.s housed within one or more racks (not shown), or many racks housed in data centers at various geographical locations (also not shown). Separate groupings of node C.R.s within grouped computing resources 1314 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1312 may configure or otherwise control one or more node C.R.s 1316(1)-1316(N) and/or grouped computing resources 1314. In at least one embodiment, resource orchestrator 1312 may include a software design infrastructure ("SDI") management entity for data center 1300. In at least one embodiment, resource orchestrator may include hardware, software or some combination thereof.

In at least one embodiment, as shown in FIG. 13, framework layer 1320 includes a job scheduler 1322, a configuration manager 1324, a resource manager 1326 and a distributed file system 1328. In at least one embodiment, framework layer 1320 may include a framework to support software 1332 of software layer 1330 and/or one or more application(s) 1342 of application layer 1340. In at least one embodiment, software 1332 or application(s) 1342 may respectively include web-based service software or applications, such as those provided by Amazon Web Services, Google Cloud and Microsoft Azure. In at least one embodiment, framework layer 1320 may be, but is not limited to, a type of free and open-source software web application framework such as Apache Spark™ (hereinafter "Spark") that may utilize distributed file system 1328 for large-scale data processing (e.g., "big data"). In at least one embodiment, job scheduler 1322 may include a Spark driver to facilitate scheduling of workloads supported by various layers of data center 1300. In at least one embodiment, configuration manager 1324 may be capable of configuring different layers such as software layer 1330 and framework layer 1320 including Spark and distributed file system 1328 for supporting large-scale data processing. In at least one embodiment, resource manager 1326 may be capable of managing clustered or grouped computing resources mapped to or allocated for support of distributed file system 1328 and job scheduler 1322. In at least one embodiment, clustered or grouped computing resources may include grouped computing resource 1314 at data center infrastructure layer 1310. In at least one embodiment, resource manager 1326 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1328 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1328 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1324, resource manager 1326, and resource orchestrator 1312 may implement any number and type of self-modifying actions based on any amount and type of data acquired in any technically feasible fashion. In at least one embodiment, self-modifying actions may relieve a data center operator of data center 1300 from making possibly bad configuration decisions and possibly avoiding underutilized and/or poor performing portions of a data center.

In at least one embodiment, data center 1300 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1300. In at least one embodiment, trained machine learning models corresponding to one or more neural networks may be used to infer or predict information using resources described above with respect to data center 1300 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1115 are used to perform inferencing and/or training operations associated with one or more embodiments. Details regarding inference and/or training logic 1115 are provided below in conjunction with FIGS. 12 and/or 13. In at least one embodiment, inference and/or training logic 1115 may be used in system FIG. 13 for inferencing or predicting operations based, at least in part, on weight parameters calculated using neural network training operations, neural network functions and/or architectures, or neural network use cases described herein. A data center 1300 such as that illustrated in FIG. 13 can be used to perform at least some of the processing and/or storage discussed herein remote from a device on which the video is generated or analyzed, or upon which the game is being played. Such a data center may also include servers that host these games or other relevant applications in at least some embodiments.

Computer Systems

Figure 14:
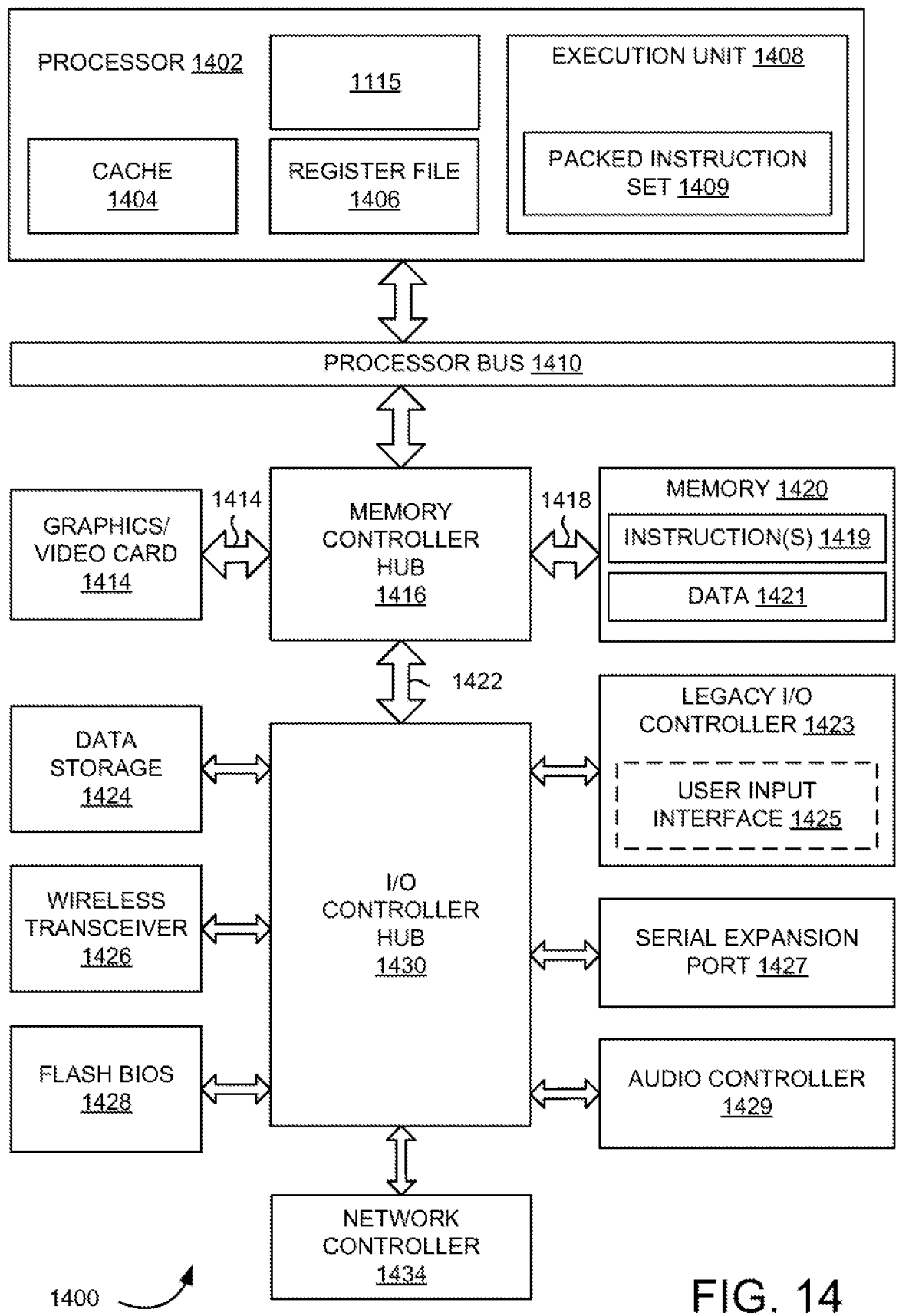
FIG. 14 illustrates a computer system, according to at least one embodiment.

FIG. 14 is a block diagram illustrating an exemplary computer system, which may be a system with interconnected devices and components, a system-on-a-chip (SOC) or some combination thereof 1400 formed with a processor that may include execution units to execute an instruction, according to at least one embodiment. In at least one embodiment, computer system 1400 may include, without limitation, a component, such as a processor 1402 to employ execution units including logic to perform algorithms for process data, in accordance with present disclosure, such as in embodiment described herein. In at least one embodiment, computer system 1400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1400 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1400 may include, without limitation, processor 1402 that may include, without limitation, one or more execution units 1408 to perform machine learning model training and/or inferencing according to techniques described herein. In at least one embodiment, computer system 1400 is a single processor desktop or server system, but in another embodiment computer system 1400 may be a multiprocessor system. In at least one embodiment, processor 1402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1402 may be coupled to a processor bus 1410 that may transmit data signals between processor 1402 and other components in computer system 1400.

In at least one embodiment, processor 1402 may include, without limitation, a Level 1 ("L1") internal cache memory ("cache") 1404. In at least one embodiment, processor 1402 may have a single internal cache or multiple levels of internal cache. In at least one embodiment, cache memory may reside external to processor 1402. Other embodiments may also include a combination of both internal and external caches depending on particular implementation and needs. In at least one embodiment, register file 1406 may store different types of data in various registers including, without limitation, integer registers, floating point registers, status registers, and instruction pointer register.

In at least one embodiment, execution unit 1408, including, without limitation, logic to perform integer and floating point operations, also resides in processor 1402. In at least one embodiment, processor 1402 may also include a microcode ("ucode") read only memory ("ROM") that stores microcode for certain macro instructions. In at least one embodiment, execution unit 1408 may include logic to handle a packed instruction set 1409. In at least one embodiment, by including packed instruction set 1409 in an instruction set of a general-purpose processor 1402, along with associated circuitry to execute instructions, operations used by many multimedia applications may be performed using packed data in a general-purpose processor 1402. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1408 may also be used in microcontrollers, embedded processors, graphics devices, DSPs, and other types of logic circuits. In at least one embodiment, computer system 1400 may include, without limitation, a memory 1420. In at least one embodiment, memory 1420 may be implemented as a Dynamic Random Access Memory ("DRAM") device, a Static Random Access Memory ("SRAM") device, flash memory device, or other memory device. In at least one embodiment, memory 1420 may store instruction(s) 1419 and/or data 1421 represented by data signals that may be executed by processor 1402.

In at least one embodiment, system logic chip may be coupled to processor bus 1410 and memory 1420. In at least one embodiment, system logic chip may include, without limitation, a memory controller hub ("MCH") 1416, and processor 1402 may communicate with MCH 1416 via processor bus 1410. In at least one embodiment, MCH 1416 may provide a high bandwidth memory path 1418 to memory 1420 for instruction and data storage and for storage of graphics commands, data and textures. In at least one embodiment, MCH 1416 may direct data signals between processor 1402, memory 1420, and other components in computer system 1400 and to bridge data signals between processor bus 1410, memory 1420, and a system I/O 1422. In at least one embodiment, system logic chip may provide a graphics port for coupling to a graphics controller. In at least one embodiment, MCH 1416 may be coupled to memory 1420 through a high bandwidth memory path 1418 and graphics/video card 1412 may be coupled to MCH 1416 through an Accelerated Graphics Port ("AGP") interconnect 1414.

In at least one embodiment, computer system 1400 may use system I/O 1422 that is a proprietary hub interface bus to couple MCH 1416 to I/O controller hub ("ICH") 1430. In at least one embodiment, ICH 1430 may provide direct connections to some I/O devices via a local I/O bus. In at least one embodiment, local I/O bus may include, without limitation, a high-speed I/O bus for connecting peripherals to memory 1420, chipset, and processor 1402. Examples may include, without limitation, an audio controller 1429, a firmware hub ("flash BIOS") 1428, a wireless transceiver 1426, a data storage 1424, a legacy I/O controller 1423 containing user input and keyboard interfaces 1425, a serial expansion port 1427, such as Universal Serial Bus ("USB"), and a network controller 1434. Data storage 1424 may comprise a hard disk drive, a floppy disk drive, a CD-ROM device, a flash memory device, or other mass storage device.

In at least one embodiment, FIG. 14 illustrates a system, which includes interconnected hardware devices or "chips", whereas in other embodiments, FIG. 14 may illustrate an exemplary System on a Chip ("SoC"). In at least one embodiment, devices illustrated in FIG. 14 may be interconnected with proprietary interconnects, standardized interconnects (e.g., PCIe) or some combination thereof. In at least one embodiment, one or more components of computer system 1400 are interconnected using compute express link (CXL) interconnects.

Inference and/or training logic 1115 are used to perform inferencing and/or training operations associated with one or more embodiments. Details regarding inference and/or training logic 1115 are provided below in conjunction with FIGS. 12 and/or 13. In at least one embodiment, inference and/or training logic 1115 may be used in system FIG. 14 for inferencing or predicting operations based, at least in part, on weight parameters calculated using neural network training operations, neural network functions and/or architectures, or neural network use cases described herein.

Figure 15:
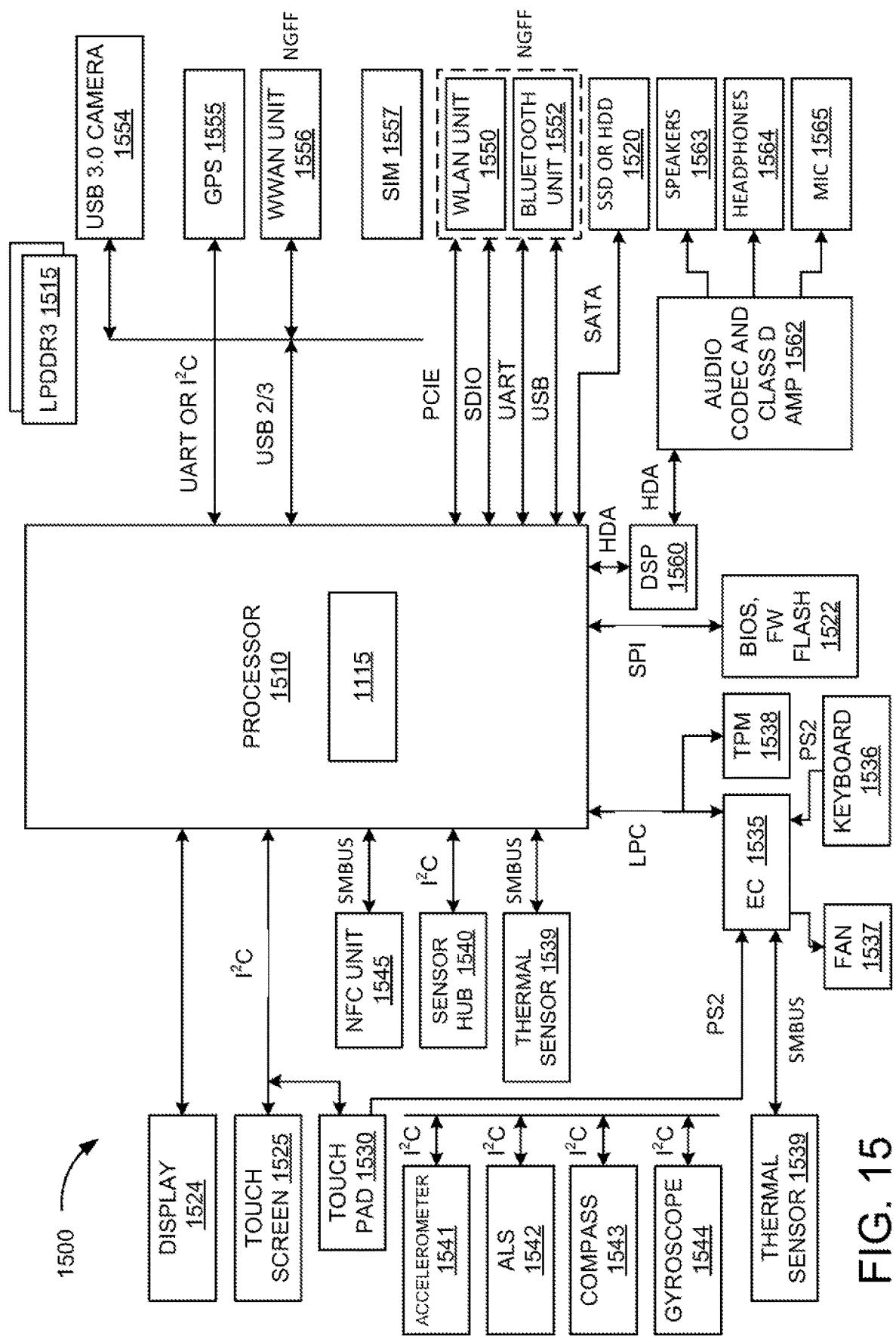
FIG. 15 illustrates a computer system, according to at least one embodiment.

FIG. 15 is a block diagram illustrating an electronic device 1500 for utilizing a processor 1510, according to at least one embodiment. In at least one embodiment, electronic device 1500 may be, for example and without limitation, a notebook, a tower server, a rack server, a blade server, a laptop, a desktop, a tablet, a mobile device, a phone, an embedded computer, or any other suitable electronic device.

In at least one embodiment, system 1500 may include, without limitation, processor 1510 communicatively coupled to any suitable number or kind of components, peripherals, modules, or devices. In at least one embodiment, processor 1510 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 15 illustrates a system, which includes interconnected hardware devices or "chips", whereas in other embodiments, FIG. 15 may illustrate an exemplary System on a Chip ("SoC"). In at least one embodiment, devices illustrated in FIG. 15 may be interconnected with proprietary interconnects, standardized interconnects (e.g., PCIe) or some combination thereof. In at least one embodiment, one or more components of FIG. 15 are interconnected using compute express link (CXL) interconnects.

In at least one embodiment, FIG. 15 may include a display 1524, a touch screen 1525, a touch pad 1530, a Near Field Communications unit ("NFC") 1545, a sensor hub 1540, a thermal sensor 1546, an Express Chipset ("EC") 1535, a Trusted Platform Module ("TPM") 1538, BIOS/firmware/flash memory ("BIOS, FW Flash") 1522, a DSP 1560, a drive 1520 such as a Solid State Disk ("SSD") or a Hard Disk Drive ("HDD"), a wireless local area network unit ("WLAN") 1550, a Bluetooth unit 1552, a Wireless Wide Area Network unit ("WWAN") 1556, a Global Positioning System (GPS) 1555, a camera ("USB 3.0 camera") 1554 such as a USB 3.0 camera, and/or a Low Power Double Data Rate ("LPDDR") memory unit ("LPDDR3") 1515 implemented in, for example, LPDDR3 standard. These components may each be implemented in any suitable manner.

In at least one embodiment, other components may be communicatively coupled to processor 1510 through components discussed above. In at least one embodiment, an accelerometer 1541, Ambient Light Sensor ("ALS") 1542, compass 1543, and a gyroscope 1544 may be communicatively coupled to sensor hub 1540. In at least one embodiment, thermal sensor 1539, a fan 1537, a keyboard 1546, and a touch pad 1530 may be communicatively coupled to EC 1535. In at least one embodiment, speaker 1563, headphones 1564, and microphone ("mic") 1565 may be communicatively coupled to an audio unit ("audio codec and class d amp") 1562, which may in turn be communicatively coupled to DSP 1560. In at least one embodiment, audio unit 1564 may include, for example and without limitation, an audio coder/decoder ("codec") and a class D amplifier. In at least one embodiment, SIM card ("SIM") 1557 may be communicatively coupled to WWAN unit 1556. In at least one embodiment, components such as WLAN unit 1550 and Bluetooth unit 1552, as well as WWAN unit 1556 may be implemented in a Next Generation Form Factor ("NGFF").

Inference and/or training logic 1115 are used to perform inferencing and/or training operations associated with one or more embodiments. Details regarding inference and/or training logic 1115 are provided below in conjunction with FIGS. 12 and/or 13. In at least one embodiment, inference and/or training logic 1115 may be used in system FIG. 15 for inferencing or predicting operations based, at least in part, on weight parameters calculated using neural network training operations, neural network functions and/or architectures, or neural network use cases described herein.

Figure 16:
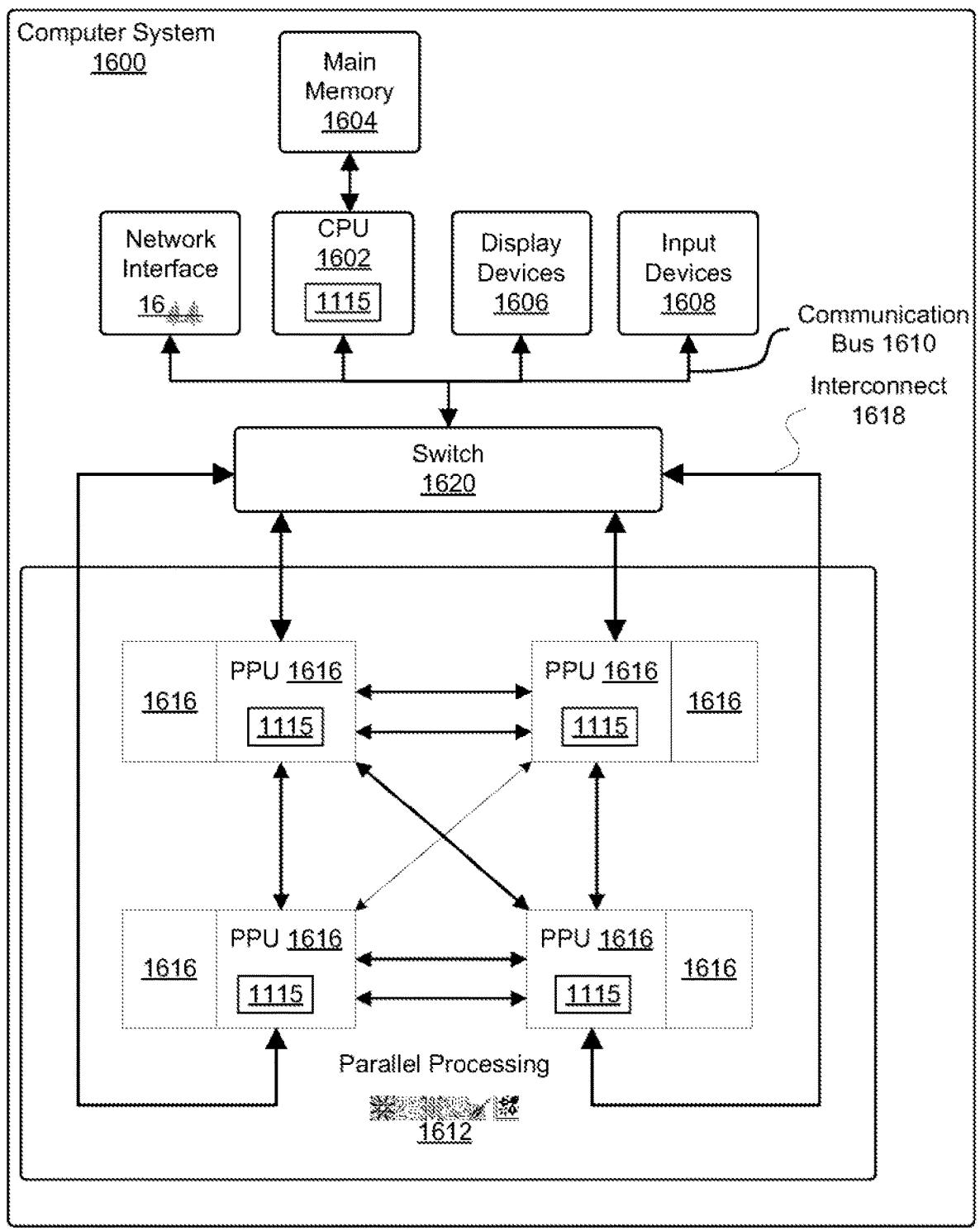
FIG. 16 illustrates a computer system, according to at least one embodiment.

FIG. 16 illustrates a computer system 1600, according to at least one embodiment. In at least one embodiment, computer system 1600 is configured to implement various processes and methods described throughout this disclosure.

In at least one embodiment, computer system 1600 comprises, without limitation, at least one central processing unit ("CPU") 1602 that is connected to a communication bus 1610 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1600 includes, without limitation, a main memory 1604 and control logic (e.g., implemented as hardware, software, or a combination thereof) and data are stored in main memory 1604 which may take form of random access memory ("RAM"). In at least one embodiment, a network interface subsystem ("network interface") 1622 provides an interface to other computing devices and networks for receiving data from and transmitting data to other systems from computer system 1600.

In at least one embodiment, computer system 1600, in at least one embodiment, includes, without limitation, input devices 1608, parallel processing system 1612, and display devices 1606 which can be implemented using a cathode ray tube ("CRT"), liquid crystal display ("LCD"), light emitting diode ("LED"), plasma display, or other suitable display technologies. In at least one embodiment, user input is received from input devices 1608 such as keyboard, mouse, touchpad, microphone, and more. In at least one embodiment, each of foregoing modules can be situated on a single semiconductor platform to form a processing system.

Inference and/or training logic 1115 are used to perform inferencing and/or training operations associated with one or more embodiments. Details regarding inference and/or training logic 1115 are provided below in conjunction with FIGS. 12 and/or 13. In at least one embodiment, inference and/or training logic 1115 may be used in system FIG. 16 for inferencing or predicting operations based, at least in part, on weight parameters calculated using neural network training operations, neural network functions and/or architectures, or neural network use cases described herein.

Figure 17:
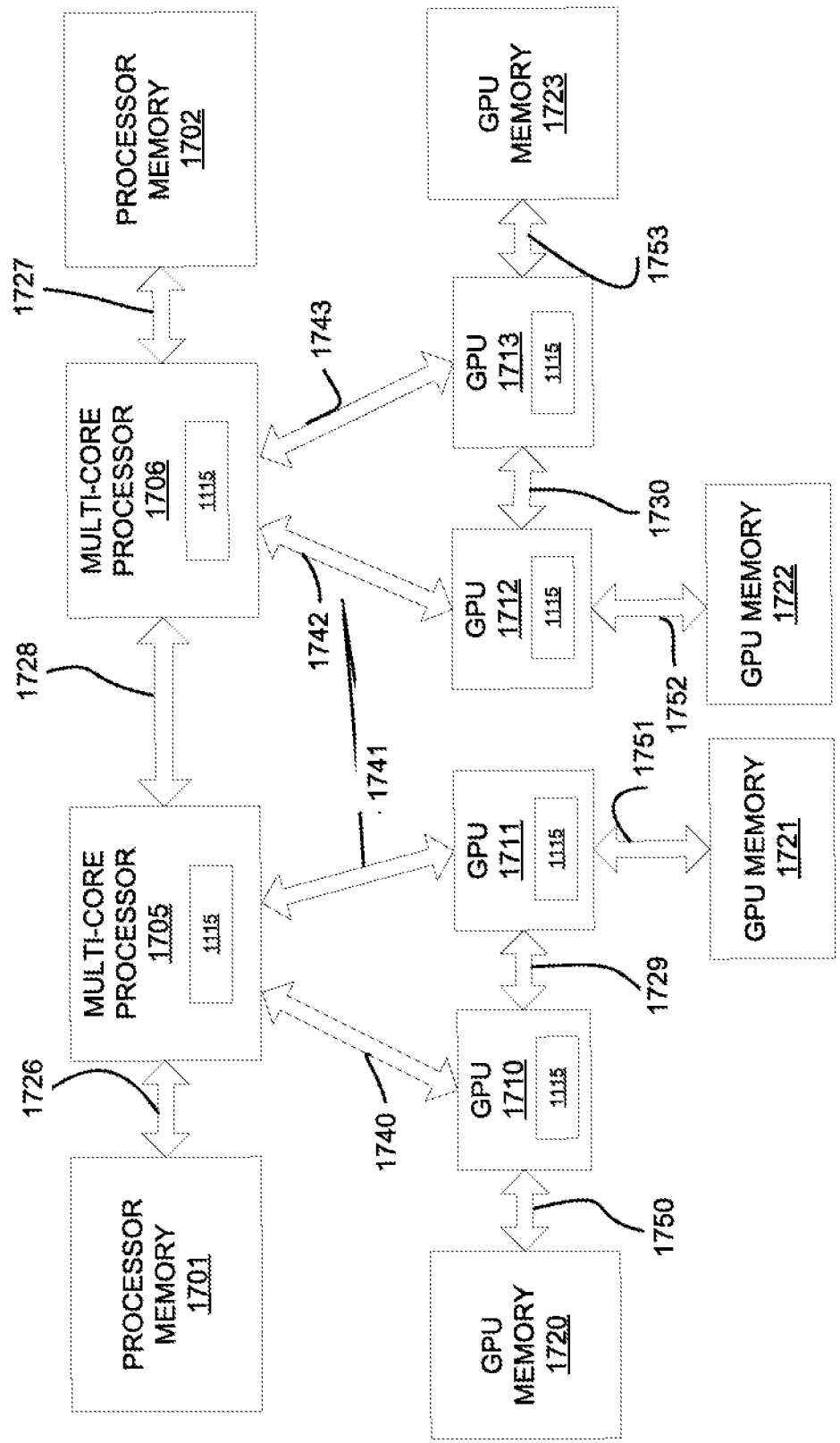
FIG. 17 illustrates a computer system, according to at least one embodiment.

FIG. 17 illustrates an exemplary architecture in which a plurality of GPUs 1710-1713 is communicatively coupled to a plurality of multi-core processors 1705-1706 over high-speed links 1740-1743 (e.g., buses, point-to-point interconnects, etc.). In one embodiment, high-speed links 1740-1743 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 1710-1713 are interconnected over high-speed links 1729-1730, which may be implemented using same or different protocols/links than those used for high-speed links 1740-1743. Similarly, two or more of multi-core processors 1705-1706 may be connected over high speed link 1728 which may be symmetric multi-processor (SMP) buses operating at 20 GB/s, 30 GB/s, 120 GB/s or higher. Alternatively, all communication between various system components shown in FIG. 17 may be accomplished using same protocols/links (e.g., over a common interconnection fabric).

In one embodiment, each multi-core processor 1705-1706 is communicatively coupled to a processor memory 1701-1702, via memory interconnects 1726-1727, respectively, and each GPU 1710-1713 is communicatively coupled to GPU memory 1720-1723 over GPU memory interconnects 1750-1753, respectively. Memory interconnects 1726-1727 and 1750-1753 may utilize same or different memory access technologies. By way of example, and not limitation, processor memories 1701-1702 and GPU memories 1720-1723 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 1701-1702 may be volatile memory and another portion may be non-volatile memory (e.g., using a two-level memory (2LM) hierarchy).

As described below, although various processors 1705-1706 and GPUs 1710-1713 may be physically coupled to a particular memory 1701-1702, 1720-1723, respectively, a unified memory architecture may be implemented in which a same virtual system address space (also referred to as "effective address" space) is distributed among various physical memories. For example, processor memories 1701-1702 may each comprise 64 GB of system memory address space and GPU memories 1720-1723 may each comprise 32 GB of system memory address space (resulting in a total of 256 GB addressable memory in this example).

FIG. 17 illustrates additional details for an interconnection between a multi-core processor 1707 and a graphics acceleration module 1746 in accordance with one exemplary embodiment. Graphics acceleration module 1746 may include one or more GPU chips integrated on a line card which is coupled to processor 1707 via high-speed link 1740. Alternatively, graphics acceleration module 1746 may be integrated on a same package or chip as processor 1707.

In at least one embodiment, illustrated processor 1707 includes a plurality of cores 1760A-1760D, each with a translation lookaside buffer 1761A-1761D and one or more caches 1762A-1762D. In at least one embodiment, cores 1760A-1760D may include various other components for executing instructions and processing data which are not illustrated. Caches 1762A-1762D may comprise level 1 (L1) and level 2 (L2) caches. In addition, one or more shared caches 1756 may be included in caches 1762A-1762D and shared by sets of cores 1760A-1760D. For example, one embodiment of processor 1707 includes 24 cores, each with its own L1 cache, twelve shared L2 caches, and twelve shared L3 caches. In this embodiment, one or more L2 and L3 caches are shared by two adjacent cores. Processor 1707 and graphics acceleration module 1746 connect with system memory 1714, which may include processor memories 1701-1702 of FIG. 17.

Figure 18:
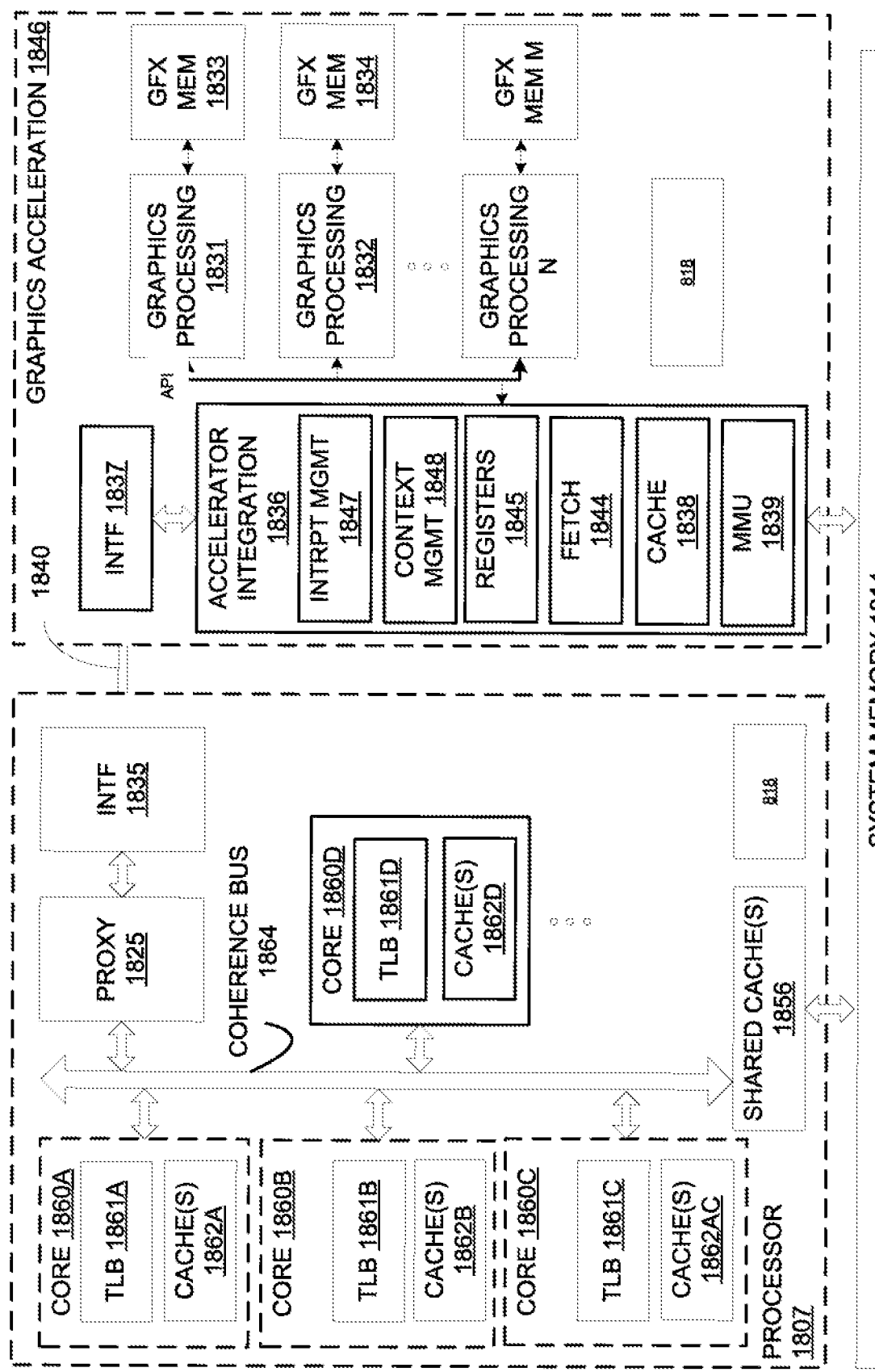
FIG. 18 illustrates a computer system, according to at least one embodiment.

Coherency is maintained for data and instructions stored in various caches 1862A-1862D, 1856 and system memory 1814 via inter-core communication over a coherence bus 1864 as illustrated in FIG. 18. For example, each cache may have cache coherency logic/circuitry associated therewith to communicate to over coherence bus 1864 in response to detected reads or writes to particular cache lines. In one implementation, a cache snooping protocol is implemented over coherence bus 1864 to snoop cache accesses.

In one embodiment, a proxy circuit 1825 communicatively couples graphics acceleration module 1846 to coherence bus 1864, allowing graphics acceleration module 1846 to participate in a cache coherence protocol as a peer of cores 1860A-1860D. In particular, an interface 1835 provides connectivity to proxy circuit 1825 over high-speed link 1840 (e.g., a PCIe bus, NVLink, etc.) and an interface 1837 connects graphics acceleration module 1846 to link 1840.

In one implementation, an accelerator integration circuit 1836 provides cache management, memory access, context management, and interrupt management services on behalf of a plurality of graphics processing engines 1831, 1832, N of graphics acceleration module 1846. Graphics processing engines 1831, 1832, N may each comprise a separate graphics processing unit (GPU). Alternatively, graphics processing engines 1831, 1832, N may comprise different types of graphics processing engines within a GPU such as graphics execution units, media processing engines (e.g., video encoders/decoders), samplers, and blit engines. In at least one embodiment, graphics acceleration module 1846 may be a GPU with a plurality of graphics processing engines 1831-1832, N or graphics processing engines 1831-1832, N may be individual GPUs integrated on a common package, line card, or chip.

In one embodiment, accelerator integration circuit 1836 includes a memory management unit (MMU) 1839 for performing various memory management functions such as virtual-to-physical memory translations (also referred to as effective-to-real memory translations) and memory access protocols for accessing system memory 1814. MMU 1839 may also include a translation lookaside buffer (TLB) (not shown) for caching virtual/effective to physical/real address translations. In one implementation, a cache 1838 stores commands and data for efficient access by graphics processing engines 1831-1832, N. In one embodiment, data stored in cache 1838 and graphics memories 1833-1834, M is kept coherent with core caches 1862A-1862D, 1856, and system memory 1814. As mentioned above, this may be accomplished via proxy circuit 1825 on behalf of cache 1838 and memories 1833-1834, M (e.g., sending updates to cache 1838 related to modifications/accesses of cache lines on processor caches 1862A-1862D, 1856, and receiving updates from cache 1838).

A set of registers 1845 in FIG. 18 store context data for threads executed by graphics processing engines 1831-1832, N and a context management circuit 1848 manages thread contexts. For example, context management circuit 1848 may perform save and restore operations to save and restore contexts of various threads during contexts switches (e.g., where a first thread is saved and a second thread is stored so that a second thread can be executed by a graphics processing engine). For example, on a context switch, context management circuit 1848 may store current register values to a designated region in memory (e.g., identified by a context pointer). It may then restore register values when returning to a context. In one embodiment, an interrupt management circuit 1847 receives and processes interrupts received from system devices.

In one implementation, virtual/effective addresses from a graphics processing engine 1831 are translated to real/physical addresses in system memory 1814 by MMU 1839. One embodiment of accelerator integration circuit 1836 supports multiple (e.g., 4, 8, 16) graphics accelerator modules 1846 and/or other accelerator devices. Graphics accelerator module 1846 may be dedicated to a single application executed on processor 1807 or may be shared between multiple applications. In one embodiment, a virtualized graphics execution environment is presented in which resources of graphics processing engines 1831-1832, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1836 performs as a bridge to a system for graphics acceleration module 1846 and provides address translation and system memory cache services. In addition, accelerator integration circuit 1836 may provide virtualization facilities for a host processor to manage virtualization of graphics processing engines 1831-1832, N, interrupts, and memory management.

Because hardware resources of graphics processing engines 1831-1832, N are mapped explicitly to a real address space seen by host processor 1807, any host processor can address these resources directly using an effective address value. One function of accelerator integration circuit 1836, in one embodiment, is physical separation of graphics processing engines 1831-1832, N so that they appear to a system as independent units.

In at least one embodiment, one or more graphics memories 1833-1834, M are coupled to each of graphics processing engines 1831-1832, N, respectively. Graphics memories 1833-1834, M store instructions and data being processed by each of graphics processing engines 1831-1832, N. Graphics memories 1833-1834, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 1840, biasing techniques are used to ensure that data stored in graphics memories 1833-1834, M is data which will be used most frequently by graphics processing engines 1831-1832, N and preferably not used by cores 1860A-1860D (at least not frequently). Similarly, a biasing mechanism attempts to keep data needed by cores (and preferably not graphics processing engines 1831-1832, N) within caches 1862A-1862D, 1856 of cores and system memory 1814.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 1404 and/or secondary storage. Computer programs, if executed by one or more processors, enable system 1400 to perform various functions in accordance with at least one embodiment. In at least one embodiment, memory 1404, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU; parallel processing system; an integrated circuit capable of at least a portion of capabilities of both CPU; parallel processing system; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic. Such hardware can be used to execute applications and code to support various types of processing, analysis, and storage discussed herein. For example, a given computer system might execute a game and analyze video output by the game to determine events, and then upload this event data to a remote server for analysis or storage. In other embodiments, a stream of video data might be generated by a gaming server that hosts a game involving several different client devices, and this stream might be analyzed by another server or computer system for determining events that occurred within gameplay. In some embodiments, this event data can then be used by the same, or yet another, server or computer system for processing, such as to generate a highlight video or video montage.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   receiving video data corresponding to a session;
   determining an event region in a frame of the video data, the event region including one or more objects associated with a type of event;
   upscaling image data for the event region to obtain a higher graphical resolution for the event region;
   processing the upscaled image data to recognize the one or more objects present in the event region;
   determining, using a neural network, an inference of an occurrence of an event, the neural network determining the inference based on two or more correlated event cues and the one or more objects recognized from the event region in the higher graphical resolution; and
   providing event data corresponding to the determined event.

2. The computer-implemented method of claim 1, further comprising:
   performing pre-processing of the image data before processing using optical character recognition (OCR), the pre-processing including binarization of the upscaled image data to remove background values from pixels of the event region.

3. The computer-implemented method of claim 1, further comprising:
   determining a size of the event region, the size including at least a minimum amount of pixel padding around the one or more objects.

4. The computer-implemented method of claim 1, further comprising:
   determining an upscaling algorithm to use for upscaling the image data, the upscaling algorithm including at least one of a bi-cubic, bilinear, edge-based, or fractal upscaling algorithm.

5. The computer-implemented method of claim 1, further comprising:
   determining the event based at least in part upon a current state, or change in state, of the one or more objects in the region.

6. The computer-implemented method of claim 1, further comprising:
   detecting the region using a pattern recognition algorithm.

7. The computer-implemented method of claim 1, wherein the event region corresponds to a heads-up display (HUD) presented over rendered content.

8. The computer-implemented method of claim 1, further comprising:

analyzing a periodic subset of frames of a video sequence to determine a plurality of events in the session.

9. The computer-implemented method of claim 1, further comprising:
performing pre-processing of the image data, the pre-processing including at least one of filtering, stretching, warping, perspective correction, noise removal, color space transform, color isolation, or value thresholding.

10. The computer-implemented method of claim 1, further comprising:
receiving, from an OCR engine, at least one of the two or more correlated event cues; and
utilizing at least one cue-to-event translation algorithm to determine the event data based, at least in part, upon the two or more correlated event cues.

11. The computer-implemented method of claim 1, further comprising:
receiving the video data in the form of a file or stream during, or after, the session.

12. A computer-implemented method, comprising:
determining, in a frame of video data, an object region including one or more objects;
upscaling image data for the object region to obtain a higher graphical resolution for the object region than for the frame of video data;
performing pre-processing of the upscaled image data, the pre-processing including binarization of the upscaled image data to remove background values from pixels of the object region;
processing the upscaled and pre-processed image data to recognize the one or more objects present in the object region; and
providing content relating to the recognized one or more objects based at least in part on a neural network determination of an event, the neural network to compute an inference of an occurrence of the event, the neural network determining the inference based on two or more correlated event cues and the one or more objects recognized from the event region in the higher graphical resolution.

13. The computer-implemented method of claim 12, further comprising:
determining a size of the object region, the size including at least a minimum amount of padding around the one or more objects.

14. The computer-implemented method of claim 12, further comprising:
determining an upscaling algorithm to use for upscaling the image data, the upscaling algorithm including at least one of a bi-cubic, bilinear, edge-based, or fractal upscaling algorithm.

15. The computer-implemented method of claim 12, further comprising:
determining the content to be provided based at least in part upon a current state, or change in state, of the one or more objects in the object region.

16. The computer-implemented method of claim 12, further comprising:
detecting the object region using a pattern recognition algorithm.

17. A system comprising:
one or more processors; and
memory including instructions that, when executed by the one or more processors, cause the system to:
receive video data corresponding to a session for a user;
determine an event region in a frame of the video data, the event region including one or more objects associated with a type of event;
upscale image data for the event region to obtain a higher graphical resolution for the event region;
process the upscaled image data to recognize the one or more objects present in the event region;
determine, using a neural network, an inference of an occurrence of an event the neural network determining the inference based on two or more correlated event cues and the one or more objects recognized from the event region in the higher graphical resolution; and
provide event data corresponding to the determined event.

18. The system of claim 17, wherein the instructions when executed further cause the system to:
perform pre-processing of the image data before processing using optical character recognition (OCR), the pre-processing including binarization of the upscaled image data to remove background values from pixels of the event region.

19. The system of claim 17, wherein the instructions when executed further cause the system to:
determine a size of the event region, the size including at least a minimum amount of padding around the one or more objects.

20. The system of claim 17, wherein the instructions when executed further cause the system to:
determine an upscaling algorithm to use for upscaling the image data, the upscaling algorithm including at least one of a bi-cubic, bilinear, edge-based, or fractal upscaling algorithm.

* * * * *